(12) United States Patent
Park et al.

(10) Patent No.: US 12,228,461 B2
(45) Date of Patent: Feb. 18, 2025

(54) TEMPERATURE SENSING DEVICE AND SYSTEM ON CHIP

(71) Applicant: Samsung Electronics Co., Ltd., Suwon-si (KR)

(72) Inventors: Jung Hyun Park, Seoul (KR); Kwang Ho Kim, Yongin-si (KR); Joo Seong Kim, Seoul (KR); Jun Hyeok Yang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 552 days.

(21) Appl. No.: 17/562,217

(22) Filed: Dec. 27, 2021

(65) Prior Publication Data

US 2022/0316957 A1 Oct. 6, 2022

(30) Foreign Application Priority Data

Mar. 31, 2021 (KR) .......................... 10-2021-0041701

(51) Int. Cl.
| | | |
|---|---|---|
| *G01K 7/16* | (2006.01) | |
| *G01K 1/02* | (2021.01) | |
| *G01K 7/24* | (2006.01) | |
| *G01K 7/34* | (2006.01) | |

(52) U.S. Cl.
CPC ............... *G01K 7/16* (2013.01); *G01K 1/026* (2013.01); *G01K 7/24* (2013.01); *G01K 7/34* (2013.01); *G01K 2219/00* (2013.01)

(58) Field of Classification Search
CPC ............ G01K 7/16; G01K 1/026; G01K 7/24; G01K 7/34
See application file for complete search history.

(56) References Cited

U.S. PATENT DOCUMENTS

| | | | | |
|---|---|---|---|---|
| 4,150,573 A | * | 4/1979 | Iinuma ................... | G01K 1/028 377/25 |
| 4,563,748 A | * | 1/1986 | Hanaoka ................ | G01K 7/245 374/E13.002 |
| 5,388,134 A | * | 2/1995 | Douglass ............... | G01K 1/028 374/102 |
| 5,552,999 A | * | 9/1996 | Polgreen ................ | G06F 1/206 374/E3.007 |
| 6,115,441 A | * | 9/2000 | Douglass ............... | G01K 1/028 374/170 |

(Continued)

*Primary Examiner* — Nathaniel T Woodward
*Assistant Examiner* — Philip L Cotey
(74) *Attorney, Agent, or Firm* — Harness, Dickey & Pierce, P.L.C.

(57) ABSTRACT

A temperature sensing device including a first temperature sensor having a first resistor and a first capacitor and generating a first voltage applied to at least one of the first resistor or the first capacitor based on a first clock signal and a second clock signal generated by delaying the first clock signal, a second temperature sensor having a second resistor and a second capacitor and generating a second voltage applied to at least one of the second resistor or the second capacitor based on the first and second clock signals, a controller generating code data based on the first voltage and the second voltage and generating a control signal based on the code data, and a delay locked loop circuit delaying the first clock signal based on the control signal to generate the second clock signal may be provided.

20 Claims, 22 Drawing Sheets

(56) References Cited

U.S. PATENT DOCUMENTS

| | | | |
|---|---|---|---|
| 6,327,318 B1* | 12/2001 | Bhullar | H03L 7/089 |
| | | | 375/374 |
| 6,799,889 B2* | 10/2004 | Pennock | G01K 7/015 |
| | | | 374/178 |
| 9,068,896 B2* | 6/2015 | Yun | G01K 7/32 |
| 9,389,126 B2* | 7/2016 | Kim | G01K 7/00 |
| 9,425,319 B2* | 8/2016 | Cai | H01L 21/823431 |
| 9,857,814 B2* | 1/2018 | Cohen | G01K 7/00 |
| 10,466,731 B2* | 11/2019 | Lin | G05F 3/16 |
| 10,476,457 B2* | 11/2019 | Schober | H03F 3/195 |
| 2008/0238563 A1* | 10/2008 | Kim | G01K 7/32 |
| | | | 374/170 |
| 2010/0246294 A1* | 9/2010 | Chuang | G11C 11/4076 |
| | | | 327/158 |
| 2011/0128176 A1* | 6/2011 | van Veldhoven | H03M 1/502 |
| | | | 341/155 |
| 2013/0156069 A1* | 6/2013 | Yun | G01K 7/32 |
| | | | 374/170 |
| 2014/0203879 A1* | 7/2014 | Kim | H03B 5/24 |
| | | | 331/66 |
| 2016/0054747 A1* | 2/2016 | Cohen | H02M 3/07 |
| | | | 713/300 |
| 2018/0198451 A1* | 7/2018 | Jung | H03B 5/08 |
| 2019/0068216 A1* | 2/2019 | Sai | G04F 10/005 |
| 2019/0161341 A1* | 5/2019 | Howe | B81C 1/00301 |
| 2021/0240142 A1* | 8/2021 | Bang | G05B 11/42 |
| 2021/0242872 A1* | 8/2021 | Bang | H03M 1/00 |

* cited by examiner

TEMPERATURE SENSING DEVICE AND SYSTEM ON CHIP

CROSS-REFERENCE TO RELATED APPLICATIONS

This application claims priority from Korean Patent Application No. 10-2021-0041701 filed on Mar. 31, 2021 in the Korean Intellectual Property Office, the disclosure of which is incorporated herein by reference in its entirety.

BACKGROUND

1. Field of the Invention

The present disclosure relates to temperature sensing devices and/or system on chip devices.

2. Description of the Related Art

An operation of a semiconductor element may be affected by heat generated in a fine semiconductor element. Therefore, in order to guarantee the normal operation of the semiconductor element, it is necessary to accurately measure heat generated in the semiconductor element.

A CMOS (Complementary Metal Oxide Semiconductor) temperature sensor is widely used to measure the temperature inside the semiconductor element. Research is being conducted on a way of reducing the power consumed by a temperature sensor to measure the temperature inside the semiconductor element and reducing an area occupied by the temperature sensor.

SUMMARY

Some aspects of the present disclosure provide temperature sensing devices in which power consumption and/or temperature measurement time are reduced.

Some other aspects of the present disclosure provide system on chip devices including a temperature sensor in which power consumption and/or temperature measurement time are reduced.

However, aspects of the present disclosure are not restricted to the one set forth herein. The and other aspects of the present disclosure will become more apparent to one of ordinary skill in the art to which the present disclosure pertains by referencing the detailed description of the present disclosure given below.

According to an example embodiment of the present disclosure, a temperature sensing device includes a first temperature sensor including a first resistor element and a first capacitor, the first temperature sensor configured to generate a first voltage applied to at least one of the first resistor element or the first capacitor based on a first clock signal and a second clock signal, the second clock signal generated by delaying the first clock signal, a second temperature sensor including a second resistor element and a second capacitor, the first temperature sensor configured to generate a second voltage applied to at least one of the second resistor element or the second capacitor based on the first clock signal and the second clock signal, a controller configured to generate temperature code data based on the first voltage and the second voltage, and generate a control signal based on the temperature code data, and a delay locked loop circuit configured to delay the first clock signal based on the control signal to generate the second clock signal.

According to an example embodiment of the present disclosure, a temperature sensing device includes a temperature sensor including a resistor element and a capacitor, the temperature sensor configured to convert temperature of the resistor element to a first voltage and a second voltage using a first clock signal, a time-digital converter configured to convert a time interval from a first time point, at which a level of the first voltage starts to increase and a level of the second voltage starts to decrease, to a second time point, at which the level of the first voltage and the level of the second voltage are same, to a first temperature digital signal, and a delay locked loop circuit configured to delay the first clock signal based on the first temperature digital signal to generate a second clock signal, The temperature sensor may be configured to output the first voltage and the second voltage maintained at a particular level in response to the second clock signal.

According to an example embodiment of the present disclosure, a temperature sensing device includes a temperature sensor including a resistor element and a capacitor, the temperature sensor configured to convert temperature of the resistor element to a first voltage and a second voltage, using a first clock signal, a comparator configured to generate a comparison signal based on the first voltage and the second voltage, a flip-flop configured to receive a second clock signal different from the first clock signal and compare a time of a falling edge of the first clock signal and a time of a rising edge of the second clock signal, a selector connected to both the comparator and the flip-flop and configured to output the comparison signal generated by the comparator, and a digital circuit configured to generate code data based on a selector signal from the selector, the digital circuit configured to generate a control signal based on the code data and delay one of the first clock signal or the second clock signal based on the control signal. The temperature sensor may be configured to be controlled by the delayed first clock signal.

According to an example embodiment of the present disclosure, a system on chip includes a processor and a temperature sensor embedded in the processor. The temperature sensor may include a first resistor element, a second resistor element, a first capacitor, and a second capacitor, and may be configured to generate a first voltage applied to at least one of the first resistor element or the first capacitor based on a first clock signal and a second clock signal, the second clock signal generated by delaying the first clock signal, a second voltage applied to at least one of the second resistor element or the second capacitor based on the first clock signal and the second clock signal, and a comparison signal based on the first voltage with the second voltage. The processor may be configured to generate temperature code data based on the comparison signal, a control signal based on the temperature code data, and the second clock signal by delaying the first clock signal based on the generated control signal.

BRIEF DESCRIPTION OF THE DRAWINGS

The above and other features of the present disclosure will become more apparent by describing in detail some example embodiments thereof with reference to the attached drawings, in which.

DETAILED DESCRIPTION

Hereinafter, some example embodiments according to the technical concepts of the present disclosure will be described referring to the accompanying drawings.

While the term "same," "equal" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Figure 1:
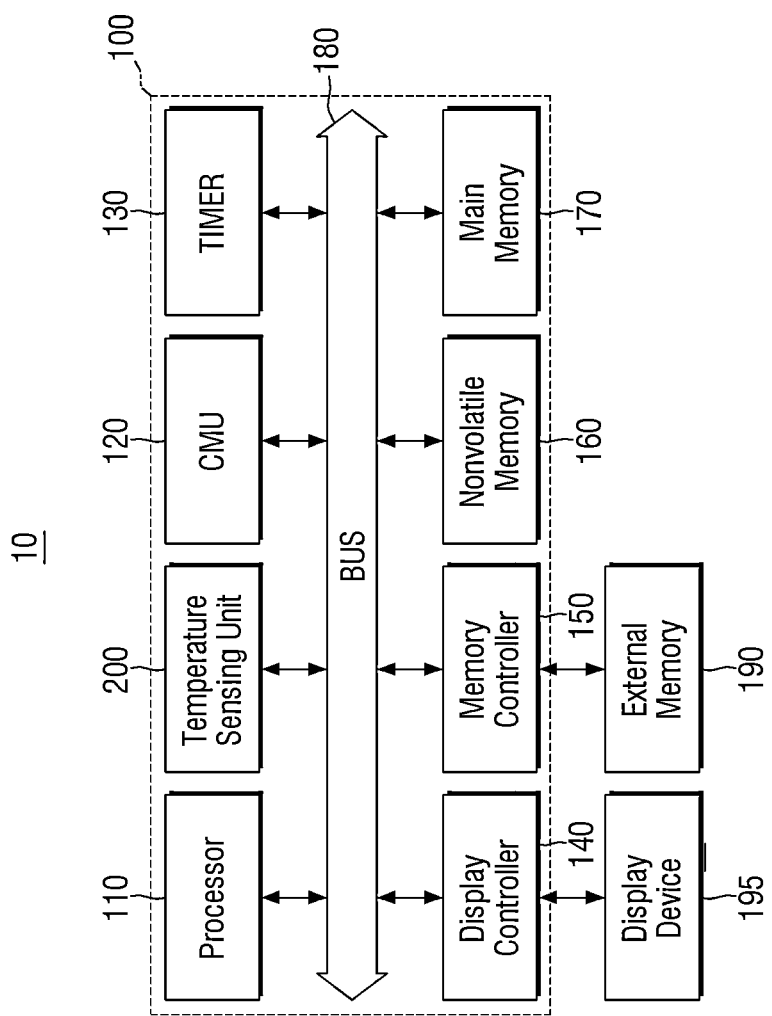
FIG. 1 is a block diagram of an electronic system according to an example embodiment.

FIG. 1 is a block diagram of an electronic system according to an example embodiment.

Referring to FIG. 1, an electronic system 10 may include a system on chip 100, an external memory 190, a display device 195, and the like.

In some example embodiments, the electronic system 10 may include a personal computer (PC), a laptop, a mobile phone, a smart phone, a tablet PC, and the like. For example, the electronic system 10 may include a telephone, a smartphone, a tablet PC (tablet personal computer), a PDA (personal digital assistant), an EDA (enterprise digital assistant), a digital still camera, a digital video camera, a PMP (portable multimedia player), a PND (personal navigation device or portable navigation device), and the like.

The system on chip (SoC) may include a processor 110, a clock management unit 120, a timer 130, a display controller 140, a memory controller 150, a non-volatile memory 160, a main memory 170, a bus 180, and a temperature sensing unit 200. Example embodiments of the present disclosure are not limited thereto, and the system on chip 100 may further include configurations different from the aforementioned configuration. For example, the system on chip 100 may further include a power management IC.

The processor 110 may include a CPU (central processing unit), an AP (application processor), and the like. The processor 110 may process or execute program or data stored in the external memory 190. For example, the processor 110 may process or execute the program or data in response to an operating clock signal that is output from the clock management unit 120. The processor 110 may be implemented as a multi-core processor. The multi-core processor may be a single computing component having two or more independent substantive processors. The processors may read and execute the program commands.

The programs or data stored in the non-volatile memory 160, the main memory 170, and the external memory 190 may be loaded into the memory of the processor 110 as needed. The non-volatile memory 160 may store permanent programs or data. The non-volatile memory 160 may be implemented as an EPROM (erasable programmable read only memory) or an EEPROM (electrically erasable programmable read only memory). The main memory 170 may temporarily store the program or data. For example, the program or data stored in the non-volatile memory 160 and the external memory 190 may be temporarily stored in the main memory 170 in accordance with the control of the processor 110 or a booting code stored in the non-volatile memory 160. The main memory 170 may include a DRAM (dynamic RAM), a SRAM (static RAM), and the like.

The timer 130 may output a count value indicating the time, on the basis of an operating clock signal that is output from the clock management unit 120. The clock management unit 120 may generate the operating clock signal. For example, the clock management unit 120 may include a clock signal generator such as a phase locked loop (PLL), a delayed locked loop (DLL) or a crystal oscillator. The operating clock signal may be provided to other components, for example, the processor 110 or the memory controller 150. Further, the operating clock signal may be provided to the temperature sensing unit 200.

The memory controller 150 may interface the external memory 190 and the system on chip 100. The memory controller 150 may generally control the operation of the external memory 190, and may control the data exchange between the host and the external memory 190. For example, the memory controller 150 may program data in the external memory 190 or read data from the external memory 190 in response to a request from the host. Here, the host may be a processor 110, a display controller 140, or the like. The external memory 190 may be storage medium for storing data, and may store an OS, a program or data. The external memory 190 may be, but is not limited to, a volatile memory. In some example embodiments, the external memory 190 may be a non-volatile memory device.

The display controller 140 may control the operation of the display device 195. The display device 195 may display the image signal that is output from the display controller 140. For example, the display device 195 may include an LCD (liquid crystal display), an LED (light emitting diode) display, an OLDE (organic LED) display, a flexible display, and the like.

The processor 110, the clock management unit 120, the timer 130, the display controller 140, the memory controller 150, the non-volatile memory 160, the main memory 170, and the like may communicate with each other through the bus 180.

The temperature sensing unit 200 may be located inside the system on chip 100 to measure the temperature of the system on chip 100. For example, the temperature sensing unit 200 may measure the temperature of the processor 110. As the system on chip 100 operates, power is consumed, and the temperature of the system on chip 100 may rise accordingly. That is, the temperature of the processor 110 may rise, and it is desired to measure the temperature. The temperature sensing unit 200 may monitor the temperature of the system on chip 100 or the processor 110. The temperature sensing unit 200 may receive an operating clock signal from the clock management unit 120, and may measure the temperature on the basis of the operating clock signal. The configuration and operation of the temperature sensing unit 200 will be described in detail in the following specification.

Figure 2:
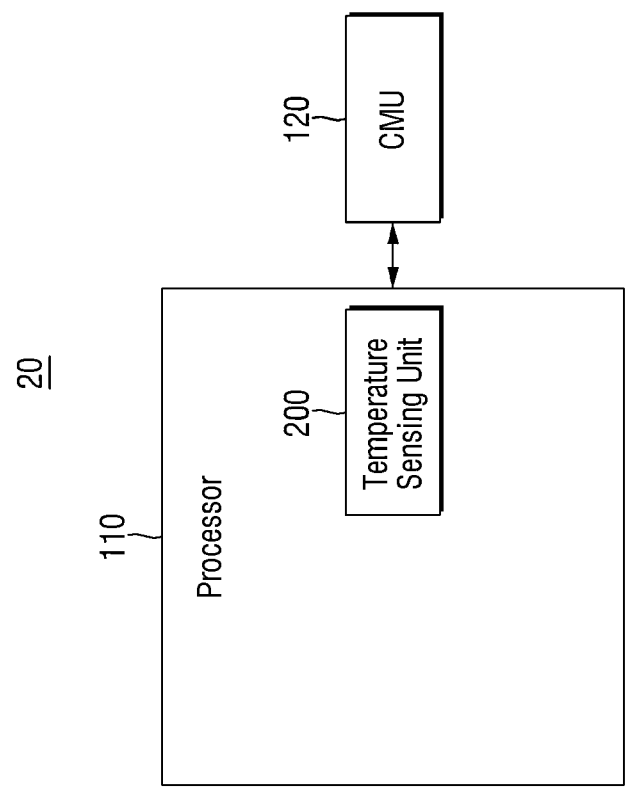
FIG. 2 is a block diagram of a temperature sensing system according to an example embodiment.

FIG. 2 is a block diagram of a temperature sensing system according to an example embodiment.

Referring to FIG. 2, the temperature sensing system 20 may include a processor 110, a temperature sensing unit 200 and a clock management unit 120. Here, the temperature sensing system 20 may be implemented by an internal configuration of the system on chip 100. The temperature sensing unit 200 may be embedded in the processor 110. For example, the temperature sensing unit 200 may be formed simultaneously during a manufacturing process of the processor 110. That is, the temperature sensing unit 200 may be a part of the processor 110. For example, when the processor 110 is manufactured in a FinFET process, the temperature sensing unit 200 may also be manufactured in the FinFET process. However, example embodiments of the present disclosure are not limited thereto, and the temperature sensing unit 200 may be located separately from the processor 110. That is, the operation of the temperature sensing unit 200 may be performed separately from the operation of the processor 110.

The clock management unit 120 may provide the operating clock signal to the processor 110 and the temperature sensing unit 200. The processor 110 may operate on the basis of the operating clock signal, and the temperature sensing unit 200 may also operate on the basis of the provided operating clock signal. Further, the processor 110 may control the clock management unit 120.

Figure 3:
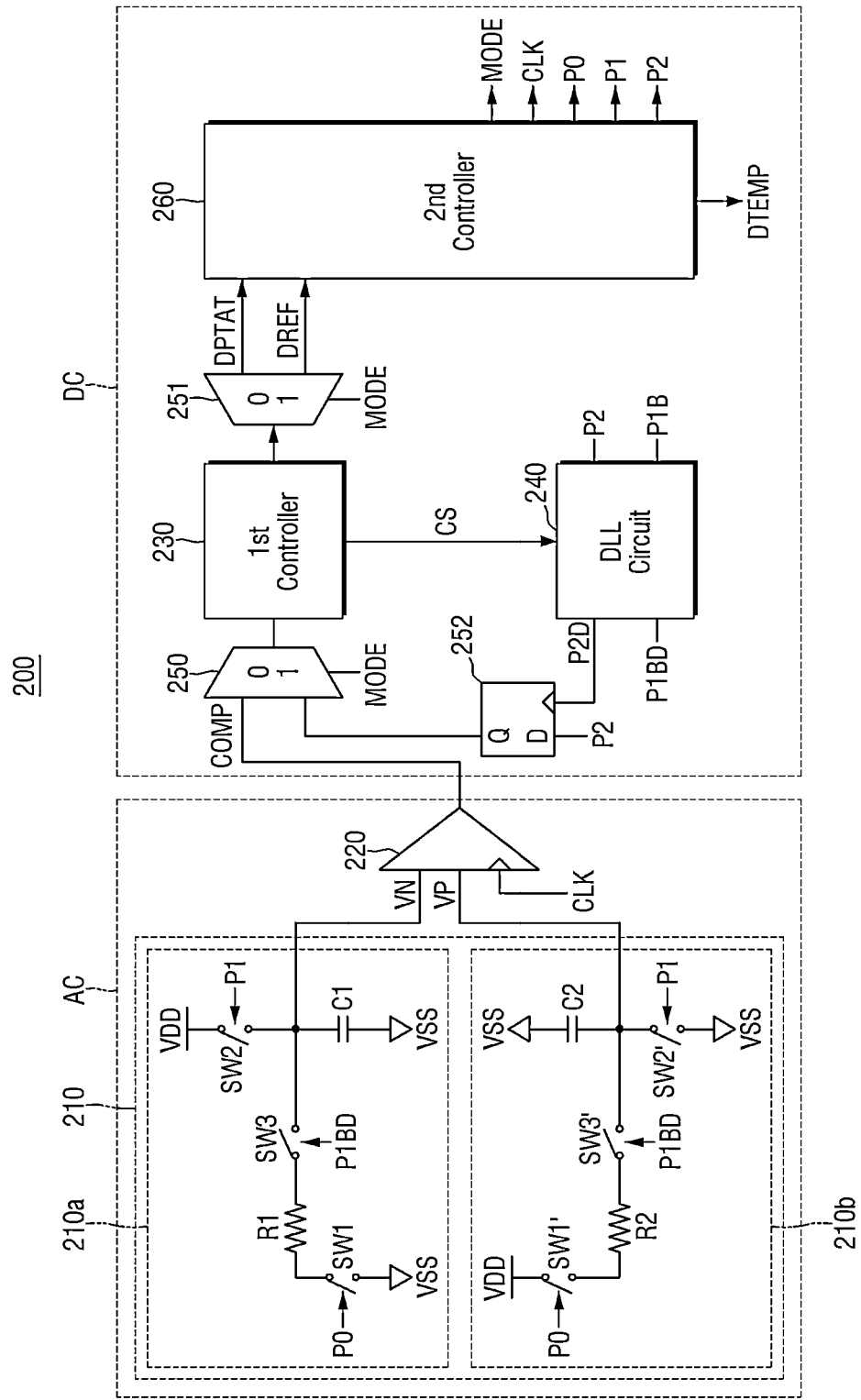
FIG. 3 is a block diagram for explaining a temperature sensing unit according to an example embodiment.
Figure 4:
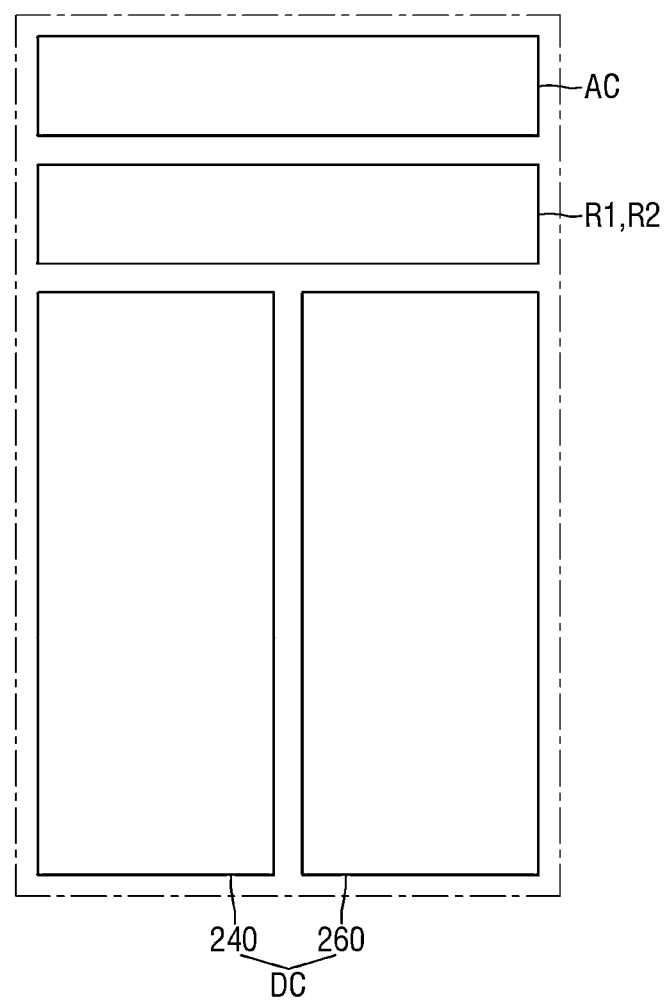
FIG. 4 is a diagram for explaining the temperature sensing unit of FIG. 3.
Figure 5:
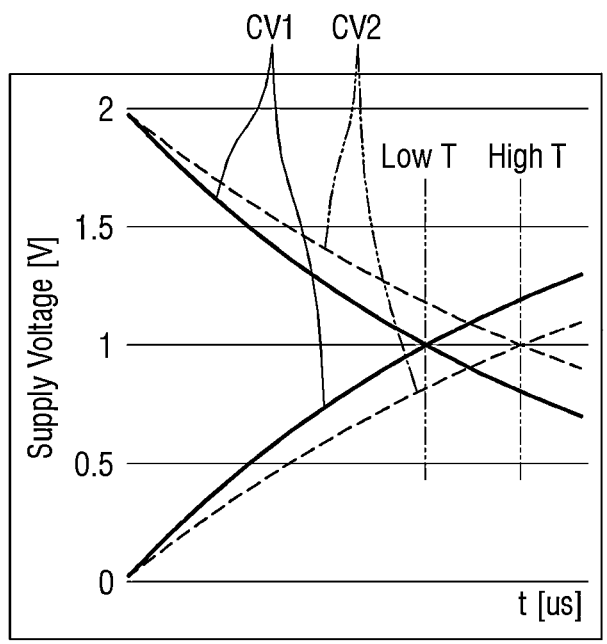
FIG. 5 is a graph for explaining the operation of the temperature sensor of FIG. 3.

FIG. 3 is a block diagram for explaining a temperature sensing unit according to an example embodiment. FIG. 4 is a diagram for explaining the temperature sensing unit of FIG. 3. FIG. 5 is a graph for explaining the operation of the temperature sensor of FIG. 3.

Referring to FIG. 3, the temperature sensing unit 200 may include an analog circuit AC and a digital circuit DC. The analog circuit AC may be manufactured through the FinFET process. The analog circuit AC may be implemented on the system on chip 100. Also, the analog circuit AC may be placed adjacent to the processor 110. That is, the analog circuit AC may be placed adjacent to the processor 110 or may be built into the processor 110 so that the temperature of the processor 110 may be sensed. Thus, the analog circuit AC may be a part of the processor 110. The digital circuit DC may be connected to the analog circuit AC. The analog circuit AC may receive a signal from the digital circuit DC and perform the operation. For example, the analog circuit AC may convert an analog signal that is output from the digital circuit DC into a digital signal. Further, the digital circuit DC may process converted digital signal. The digital circuit DC may display the temperature measured through the analog circuit AC accordingly. Here, the digital circuit DC may be implemented by the processor 110, the clock management unit 120, or the like. That is, unlike the analog circuit AC, the digital circuit DC may be a synthesizable circuit and may be implemented differently depending on programming. However, example embodiments of the present disclosure are not limited thereto.

Referring to FIG. 4, the analog circuit AC, a first resistor R1, a second resistor R2, and the digital circuit DC may be implemented on the substrate. The temperature sensing unit 200 of FIG. 4 may be formed inside the system on chip 100. The analog circuit AC may be located on one side of the temperature sensing unit 200, and the first resistor R1 and the second resistor R2 may be placed adjacent to the analog circuit AC. The digital circuit DC may be formed in a portion except the analog circuit AC and the first resistor R1 and the second resistor R2. Here, the area occupied by the digital circuit DC may be greater than the area occupied by the analog circuit AC. That is, a ratio occupied by the analog circuit AC may be smaller than a ratio occupied by the digital circuit DC, and thus the temperature sensing unit 200 having a small area may be provided. Here, in the digital circuit DC, the second controller 260 may be implemented by the processor 110 and the clock management unit 120, and correspond to a synthesizable circuit. In the circuit, the analog circuit AC, the first resistor R1, the second resistor R2, and the digital circuit DC that make up the temperature sensing unit 200 may all be connected to perform the temperature sensing.

Referring to FIG. 3 again, the analog circuit AC may include a temperature sensor 210 and a comparator 220. The temperature sensor 210 may be connected to the comparator 220, and the comparator 220 may process the signal sent from the temperature sensor 210 and provide the signal to the digital circuit DC. Further, the temperature sensor 210 may operate on the basis of the signal that is output from the digital circuit DC. That is, the analog circuit AC may be controlled by the digital circuit DC.

The temperature sensor 210 may include a first temperature sensor 210a and a second temperature sensor 210b. Although the first temperature sensor 210a and the second temperature sensor 210b may be placed separately, example embodiments of the present disclosure are not limited thereto.

The first temperature sensor 210a may include a first resistor R1, a first capacitor C1, a first switch SW1, a second switch SW2, a third switch SW3 and the like. The first resistor R1 may be located between the first switch SW1 and the third switch SW3. The first resistor R1 may connect the first switch SW1 and the third switch SW3. A portion of the first switch SW1 opposite to the first resistor R1 may be connected to a ground voltage VSS. Here, the first switch SW1 may operate on the basis of the clock signal P0. For example, when the clock signal P0 is a high signal, the first switch SW1 may be closed, and when the clock signal P0 is a low signal, the first switch SW1 may be opened.

A portion of the third switch SW3 opposite to the first resistor R1 may be connected to a node. Here, the node may be connected to the first capacitor C1, the second switch SW2 and the comparator 220. That is, the first capacitor C1, the second switch SW2, the third switch SW3, and the comparator 220 may be connected in common to the node. A first voltage VN of the node may be formed by the operation of the first capacitor C1, the second switch SW2, the third switch SW3 and the comparator 220. One end of the second switch SW2 may be connected to a power supply voltage VDD, and the other end of the second switch SW2 may be connected to the node.

The third switch SW3 may operate on the basis of a first delay clock signal P1BD. Here, when the first delay clock signal P1BD is a low signal, the third switch SW3 may be closed, and when the first delay clock signal P1BD is a high signal, the third switch SW3 may be opened. Here, the third switch SW3 may operate unlike (e.g., differently from) the first switch SW1 and the second switch SW2. The second switch SW2 may operate on the basis of the first clock signal P1. One end of the first capacitor C1 may be connected to the node, and the other end of the first capacitor C1 may be connected to the ground voltage VSS. The clock signal P0, the first clock signal P1, and the first delay clock signal P1BD that operate the first temperature sensor 210a may be provided from the digital circuit DC. That is, the first temperature sensor 210a may be controlled by the digital circuit DC. The first resistor R1 may be a metal wire formed inside a substrate in the semiconductor device. That is, the first resistor R1 may correspond to a parasitic resistor of the semiconductor device rather than a poly resistor element. The first resistor R1 may be metal routing, and may include a metal layer that connects the semiconductor elements. Here, the first resistor R1 may be manufactured by the FinFET process.

The second temperature sensor 210b may include a second resistor R2, a second capacitor C2, a first switch SW1', a second switch SW2', a third switch SW3', and the like. The second resistor R2 may be located between the first switch SW1' and the third switch SW3'. The second resistor R2 may connect the first switch SW1' and the third switch SW3'. A portion of the first switch SW1' opposite to the second resistor R2 may be connected to the power supply voltage VDD. Here, the first switch SW1' may operate on the basis of the clock signal P0. Here, the clock signal P0 may be the same as that provided to the first switch SW1.

A portion of the third switch SW3' opposite to the second resistor R2 may be connected to the node. Here, the node may be connected to the second capacitor C2, the second switch SW2' and the comparator 220. That is, the second capacitor C2, the second switch SW2', the third switch SW3' and the comparator 220 may be connected in common to the node. The second voltage VP of the node may be formed by the operation of the second capacitor C1, the second switch SW2', the third switch SW3' and the comparator 220. One end of the second switch SW2' may be connected to the ground voltage VSS, and the other end of the second switch SW2' may be connected to the node.

The third switch SW3 may operate on the basis of the first delay clock signal P1BD. Here, the first delay clock signal P1BD may be the same as the first delay clock signal P1BD applied to the third switch SW3. The second switch SW2' may operate on the basis of the first clock signal P1. Here, the first clock signal P1 may be the same as the first clock signal P1 applied to the second switch SW2. One end of the second capacitor C2 may be connected to the node, and the other end of the second capacitor C2 may be connected to the ground voltage VSS. The clock signal P0, the first clock signal P1, and the first delay clock signal P1BD that operate the second temperature sensor 210b may be provided from the digital circuit DC. That is, the second temperature sensor 210b may be controlled by the digital circuit DC. The second resistor R2 may be a metal wire formed inside the substrate in the semiconductor device. That is, the second resistor R2 may correspond to the parasitic resistor of the semiconductor device rather than a poly resistor element. The second resistor R2 may be metal routing, and may include a metal layer that connects the semiconductor elements. Here, the second resistor R2 may be manufactured by the FinFET process.

The first resistor R1 and the second resistor R2 may be located inside the system on chip 100. Also, the first resistor R1 and the second resistor R2 may be placed adjacent to the processor 110. The first resistor R1 and the second resistor R2 may correspond to an element whose resistance value increases in proportion to the temperature. For example, as the temperature of the processor 110 increases, the resistance values of the first resistor R1 and the second resistor R2 may increase. The temperature sensor 210 may provide an RC temperature sensor, by utilizing the first and second resistors R1 and R2, and the first and second capacitors C1 and C2.

According to the example embodiment, the first temperature sensor 210a may include the first resistor R1 and the first capacitor C1, and the first temperature sensor 210a generates the first voltage VN applied to at least one of the first resistor R1 or the first capacitor C1 based on the clock signal P0 and the first clock signal P1. The first clock signal P1 may be a signal generated by delaying the clock signal P0. Further, the second temperature sensor 210b may include the second resistor R2 and the second capacitor C2, and the first temperature sensor generates the second voltage VP applied to at least one of the second resistor R2 or the second capacitor C2 based on the first clock signal and the second clock signal.

Referring to FIG. 5, the time of a cross point formed by a first curve CV1 when the temperature of the system on chip 100 is low may be smaller than the time of a cross point formed by a second curve CV2 when the temperature of the system on chip 100 is high. That is, the first curve CV1 may increase or decrease more rapidly than the second curve CV2. The reason is that because the resistance values of the first resistor R1 and the second resistor R2 at a low temperature are small, the increase or decrease time of the voltage is small, and because the resistance values of the first resistor R1 and the second resistor R2 at a high temperature are large, the increase or decrease time of the voltage is large. That is, the temperature of the system on chip 100 may be converted into voltage by the first and second resistors R1 and R2, and may be subsequently converted into the time. That is, the first and second resistors R1 and R2 correspond to temperature-proportional elements. However, example embodiments of the present disclosure are not limited thereto. More detailed operation of the temperature sensor 210 will be provided below.

Referring to FIG. 3 again, the comparator 220 may be connected to the first temperature sensor 210a and the second temperature sensor 210b, and may be connected to the digital circuit DC. The comparator 220 may operate in synchronization with the clock signal CLK provided from the digital circuit DC. The comparator 220 may receive the first voltage VN from the first temperature sensor 210a and receive the second voltage VP from the second temperature sensor 210b to perform the comparison operation. The comparator 220 may generate a comparison signal COMP based on the first voltage VN and the second voltage VP. For example, the comparator 220 may compare the first voltage VN and the second voltage VP to generate the comparison signal COMP. That is, the comparator 220 may output a high signal when the first voltage VN is higher than the second voltage VP, and the comparator 220 may output a low signal when the first voltage VN is lower than or equal to the second voltage VP. The comparator 220 may correspond to a latch comparator. The comparator 220 may provide the comparison signal COMP to the digital circuit DC.

The digital circuit DC may include a first controller 230, a delay locked loop circuit 240, a selector 250, a selector 251, a latch 252 and a second controller 260. Here, the digital circuit DC except the delay locked loop circuit 240 may be implemented by the processor 110. However, example embodiments of the present disclosure are not limited thereto.

The selector 250 may be connected to the comparator 220 and the latch 252, and may output at least one of the comparison signal COMP output from the comparator 220 or the signal output from the latch 252, depending on the mode. For example, when the mode is 0, the selector 250 may output the comparison signal COMP, and when the mode MODE is 1, the selector 250 may output the latched second clock signal P2. Here, each mode MODE may be changed according to the time interval.

The signal output from the selector 250 may be sent to the first controller 230, and the first controller 230 may output at least one of a control signal CS, a temperature-proportional digital signal DPTAT, or a reference digital signal DREF, on the basis of the received signal. Here, the control signal CS may be sent to the delay locked loop circuit 240, and the temperature-proportional digital signal DPTAT and the reference digital signal DREF may be sent to the selector 251. More detailed operation of the selector 250 will be described below.

The selector 251 may be connected to the first controller 230, and may send one of the temperature-proportional digital signal DPTAT or the reference digital signal DREF output from the first controller 230 to the second controller 260, depending on the mode. That is, when the mode MODE is 0, the selector 251 may output the temperature-proportional digital signal DPTAT, and when the mode MODE is 1, the selector 251 may output the reference digital signal DREF.

The second controller 260 may generate and output a temperature digital signal DTEMP, using the temperature-proportional digital signal DPTAT or the reference digital signal DREF received from the selector 251. Further, the second controller 260 may generate a clock signal CLK, a clock signal P0 and a first clock signal P1 to be provided to the analog circuit AC, and may generate a mode MODE and a second clock signal P2 to be provided to the digital circuit DC.

The delay locked loop circuit 240 may delay the first clock signal P1, a first clock signal P1B and/or the second clock signal P2, on the basis of the control signal CS received from the first controller 230. That is, the delay locked loop circuit 240 may output the first delay clock signal P1BD or the second delay clock signal P2D. The first delay clock signal P1BD may be provided to the temperature sensor 210, and the temperature sensor 210 may operate on the basis of the first delay clock signal P1BD. The second delay clock signal P2D may be provided to the latch 252, and the latch 252 may operate in synchronization with the second delay clock signal P2D. The latch 252 may output the second clock signal P2 which is latched in synchronization with the second delay clock signal P2D.

Hereinafter, the operation of the temperature sensing unit 200 will be described in more detail referring to the drawings.

Figure 6:
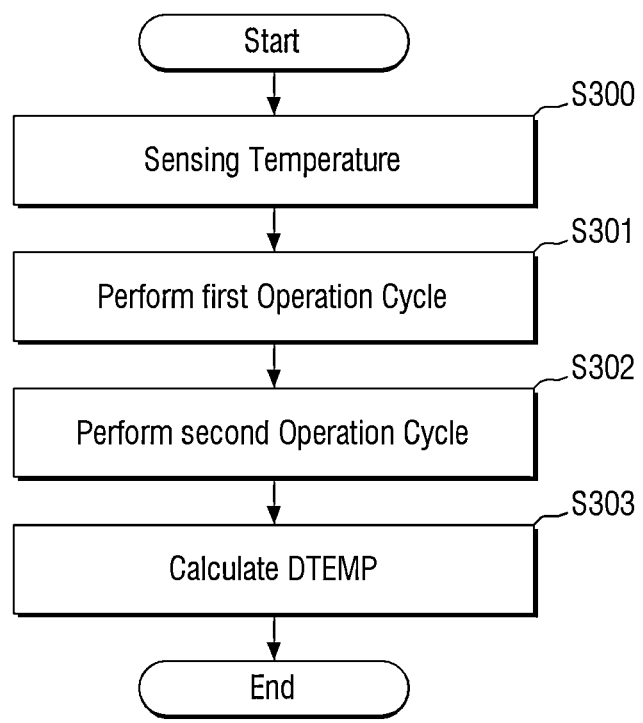
FIG. 6 is a flowchart for explaining the operation of the temperature sensing unit according to an example embodiment.

FIG. 6 is a flowchart for explaining the operation of the temperature sensing unit according to an example embodiment.

Referring to FIG. 6, the temperature sensing unit 200 may include a plurality of operations. For example, the temperature sensing unit 200 may sense the temperature (S300). Resistance values of the first resistor R1 and the second resistor R2 of the temperature sensor 210 of the analog circuit AC may change depending on the temperature of the system on chip 100. Accordingly, the degree of change in the voltage to be output from the temperature sensor 210 may vary, and the temperature sensing unit 200 may output the changed temperature data on the basis of the signal to be output (e.g., the voltage to be output from the temperature sensor 210).

The temperature sensing unit 200 may perform the first operation cycle (S301). Subsequently, the temperature sensing unit 200 may perform the second operation cycle (S302). Here, the second operation cycle may be performed after the first operation cycle is performed. That is, the time during which the first operation cycle is performed may precede the time during which the second operation cycle is performed, and the times may not overlap. The temperature-proportional digital signal DPTAT may be output as a result of performing the first operation cycle, and the reference digital signal DREF may be output as a result of performing the second operation cycle. Finally, the temperature sensing unit 200 may calculate a temperature digital signal DTEMP (S303). Here, the temperature digital signal DTEMP may be generated on the basis of the temperature-proportional digital signal DPTAT output at the first operation cycle, and the reference digital signal DREF output at the second operation cycle. Performance of the temperature sensing operation and the first operation cycle will be described in more detail referring to FIGS. 7 to 15.

Figure 7:
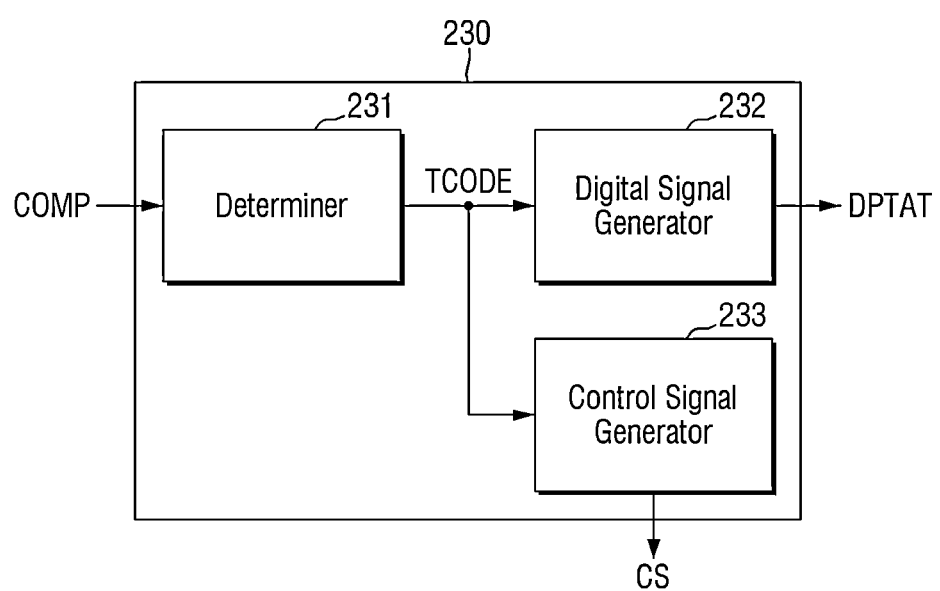
FIG. 7 is a block diagram for explaining the first controller of FIG. 3.

FIG. 7 is a block diagram for explaining the first controller of FIG. 3.

Referring to FIG. 7, the first controller 230 may include a determiner 231, a digital signal generator 232, a control signal generator 233, and the like. The configurations of the first controller 230 may not be limited to those shown. For example, the first controller 230 may include more configurations or may include fewer configurations. The first controller 230 may also correspond to a counter that counts the comparison signal COMP. In the following description, although the description will be provided on the assumption that the temperature code data TCODE or the temperature-proportional digital signal DPTAT are 5 bits, example embodiments of the present disclosure are not limited thereto. For example, the temperature code data TCODE or the temperature-proportional digital signal DPTAT may be 12 bits.

The determiner 231 may receive the comparison signal COMP and generate temperature code data TCODE on the basis of the comparison signal COMP. When the comparison signal COMP is 1, the temperature code data TCODE[n] may be 1, and when the comparison signal COMP is 0, the temperature code data TCODE[n] may be 0. Here, n may vary depending on the bits to be processed. For example, if the bits to be processed are 5 bits, n may correspond to 4 to 0. The determiner 231 may provide the generated temperature code data TCODE to the digital signal generator 232 and the control signal generator 233.

The digital signal generator 232 may generate a temperature-proportional digital signal DPTAT on the basis of the temperature code data TCODE. Here, the temperature-proportional digital signal DPTAT may correspond to 5 bits, and may be generated, using $n^{th}$ bit values of the temperature code data TCODE. For example, when the temperature code data TCODE[4] is 1, the temperature-proportional digital signal DPTAT may be 10000. However, this description is merely an example, and example embodiments of the present disclosure are not limited thereto.

The control signal generator 233 may generate a control signal CS on the basis of the temperature code data TCODE. Here, the control signal CS may correspond to 5 bits and may indicate one of the values from 0 to 31. For example, when the control signal CS having a value of 0 is sent to the delay locked loop circuit 240, the delay locked loop circuit 240 may not delay the first clock signal P1. However, when the control signal CS having a value of 15 is sent to the delay locked loop circuit 240, the delay locked loop circuit 240 may delay the first clock signal P1 by a half cycle. Referring to FIG. 3, the first delay clock signal P1BD or the second delay clock signal P2D delayed by the control signal CS may be sent to the temperature sensor 210 or the latch 252, and the delay locked loop operation or feedback of the temperature sensing unit 200 may be performed. However, this description is merely an example, and example embodiments of the present disclosure are not limited thereto.

Figure 8:
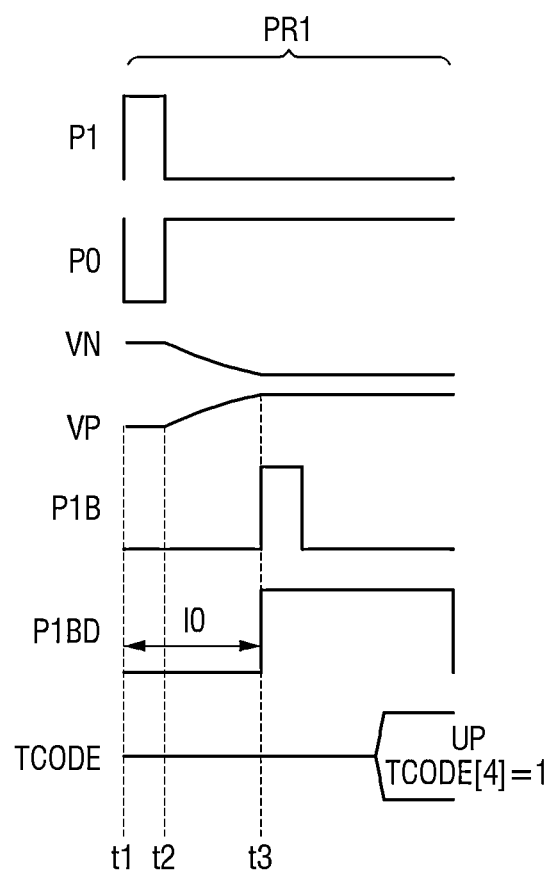
FIG. 8 is a timing diagram for explaining the operation of the temperature sensing unit according to an example embodiment.
Figure 9:
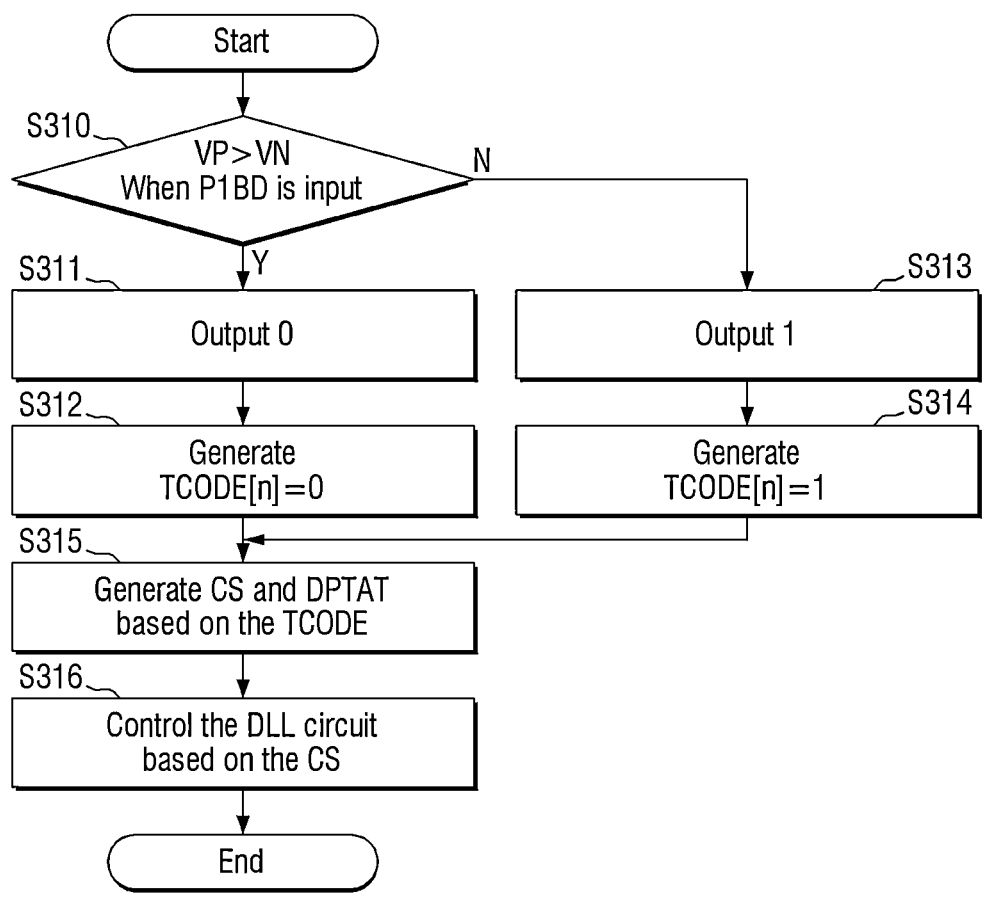
FIG. 9 is a flowchart for explaining the operation of the temperature sensing unit.
Figure 10:
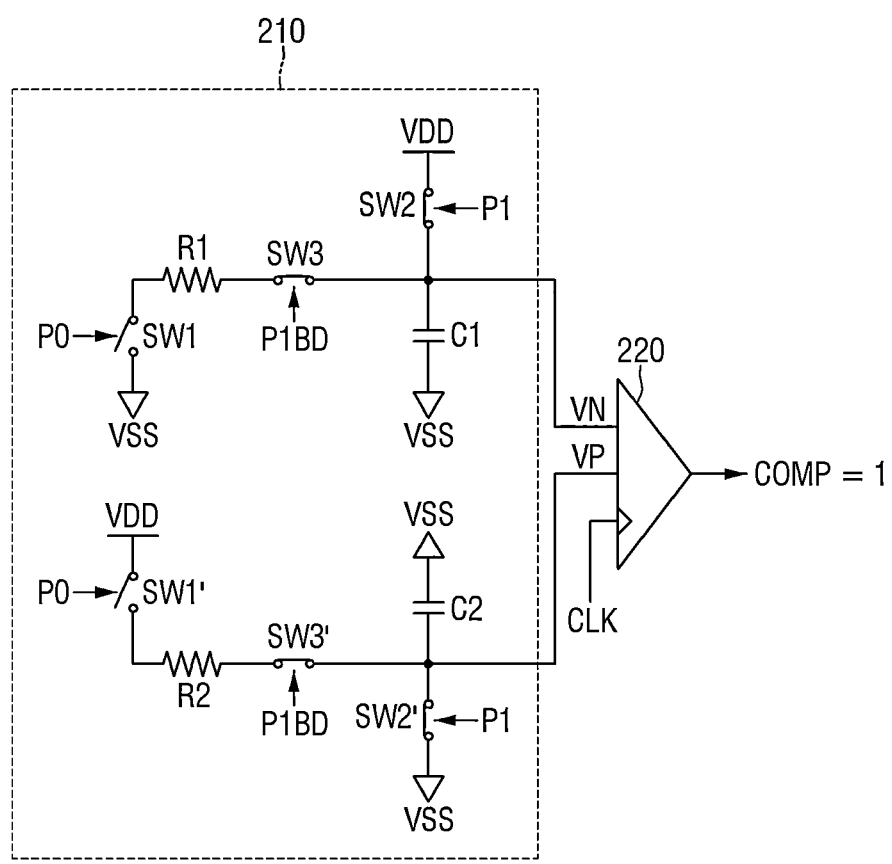
FIGS. 10 to 12 are diagrams for explaining the operation of the temperature sensing unit according to time.
Figure 11:
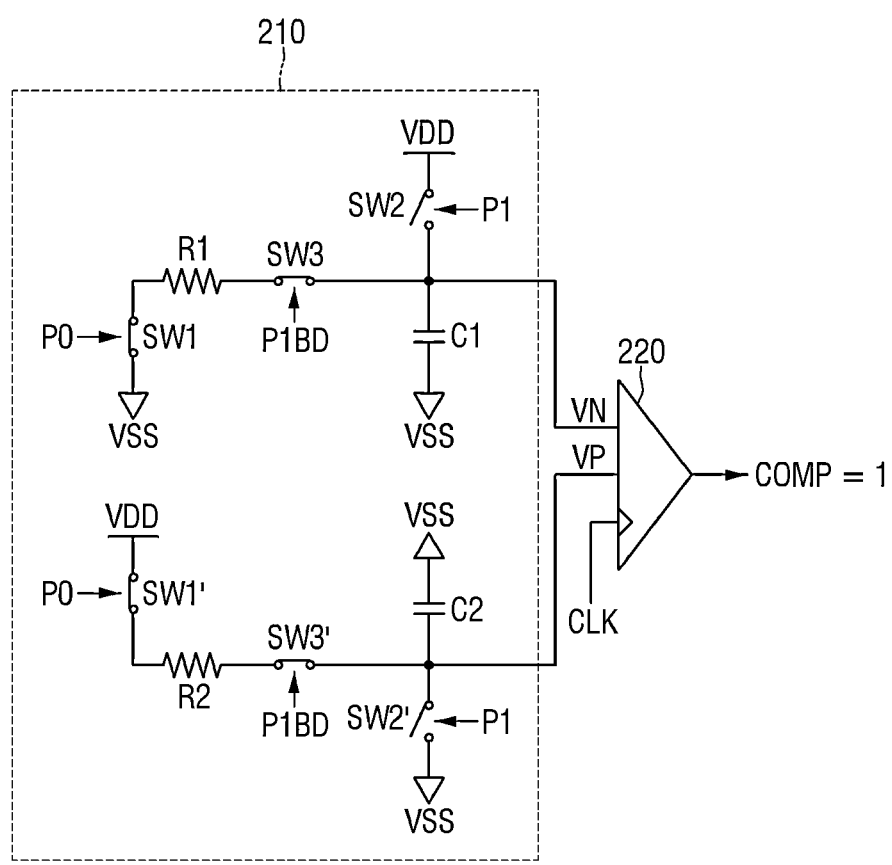
Figure 12:
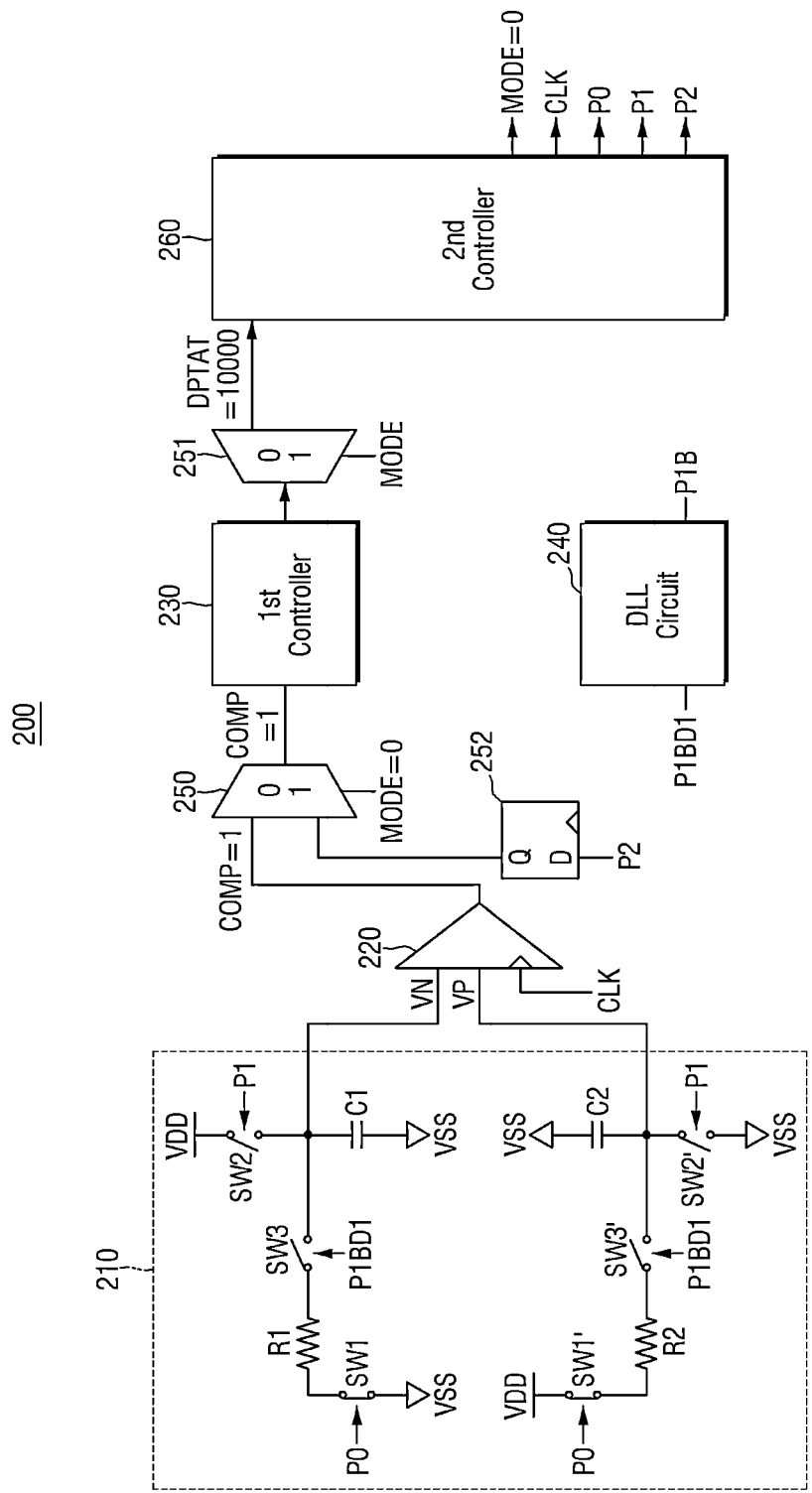

FIG. 8 is a timing diagram for explaining the operation of the temperature sensing unit according to an example embodiment. FIG. 9 is a flowchart for explaining the operation of the temperature sensing unit. FIGS. 10 to 12 are diagrams for explaining the operation of the temperature sensing unit according to time.

Referring to FIG. 8, the temperature sensing unit 200 may perform the temperature sensing operation during the first cycle PR1. Here, the first cycle PR1 may be included in the first operation cycle described in FIG. 6.

Referring to FIGS. 3, 7, and 8, the first clock signal P1 and the clock signal P0 may be provided to the temperature sensor 210. At the first time t1, the first clock signal P1 may be a high signal, and the clock signal P0 may be a low signal.

Referring to FIGS. 8 and 10, the first clock signal P1 which is the high signal, and the clock signal P0 which is the low signal may be applied to the temperature sensor 210 at the first time t1. At this time, third switches SW3 and SW3' may be closed by the first delay clock signal P1BD applied to the third switches SW3 and SW3'. The second switches SW2 and SW2' may be closed by the first clock signal P1, and the first switches SW1 and SW1' may be opened by the clock signal P0. Accordingly, the power supply voltage VDD may be applied to the first capacitor C1, and the ground voltage VSS may be applied to the second capacitor C2. The first voltage VN applied to the first capacitor C1 may be the power supply voltage VDD corresponding to the high signal, and the second voltage VP applied to the second capacitor C2 may be the ground voltage VSS corresponding to the low signal. Regardless of the previous status of the temperature sensor 210, the first voltage VN as the high signal, and the second voltage VP as the low signal may be sent to the comparator 220. Accordingly, the comparator 220 may output a comparison signal COMP corresponding to the high signal, that is, corresponding to 1.

Referring to FIGS. 8 and 11, the first clock signal P1 as the low signal, and the clock signal P0 as the high signal may be applied to the temperature sensor 210 at the second time t2. The corresponding first clock signal P1 and clock signal P0 may be applied during the remaining first cycle PR1 (e.g., the remaining time of the first cycle PR1 after the second time t2). At this time, the second switches SW2 and SW2' may be opened by the first clock signal P1, and the first switches SW1 and SW1' may be closed by the clock signal P0. The first voltage VN may be reduced by the clock signal P0 and the first clock signal P1, and the second voltage VP may be increased by the clock signal P0 and the first clock signal P1. This is because all the first temperature sensors 210a are connected to the ground voltage VSS, and the second temperature sensor 210b is connected to the power supply voltage VDD and the ground voltage VSS.

At this time, because the magnitude of the resistance values of the first and second resistors R1 and R2 is proportional to the temperature, as the higher the temperature is, the higher the change in the first voltage VN and the second voltage VP may be. Also, the lower the temperature is, the lower the change in the first voltage VN and the second voltage VP may be. Even after the second time t2, because the first voltage VN is higher than the second voltage VP, the comparison signal COMP corresponding to the high signal may be output.

Referring to FIGS. 3 and 12, the first delay clock signal P1BD may be converted into a high signal at the third time t3. Here, the first delay clock signal P1BD may be a signal generated by delay of the first clock signal P1. For example, the delay locked loop circuit 240 may delay the first clock signal P1 by a delay amount I0 to generate the first delay clock signal P1BD. At the first cycle PR1, the delay locked loop circuit 240 may not receive the control signal CS from the first controller 230, and may generate the first delay clock signal P1BD without being based on the control signal CS. For example, the first delay clock signal P1BD may have a difference from the first clock signal P1 by half the first cycle PR1.

The first delay clock signal P1BD may be maintained at a high signal during the first cycle PR1 after the third time t3. The first delay clock signal P1BD may be applied to the third switches SW3 and SW3', and the third switches SW3 and SW3' may be opened in response to this. In response to the application of the first delay clock signal P1BD which is the high signal, the first voltage VN and the second voltage VP may be maintained at the first voltage VN and the second voltage VP corresponding to the third time t3. In this example embodiment, because the first voltage VN is greater than the second voltage VP at the third time t3, the comparator 220 may output the comparison signal COMP having the high level.

The selector 250 may send the comparison signal COMP as the high signal to the first controller 230.

Referring to FIG. 9, the first controller 230 determines whether the first voltage VN is smaller than the second voltage VP when the first delay clock signal P1BD is input (S310). When the first voltage VN is smaller than the second voltage VP (S310-Y), the selector 250 may output the comparison signal COMP which is the low signal (S311). That is, the selector 250 may output a comparison signal COMP having 0. Further, when the first voltage VN is not smaller than the second voltage VP (S310-N), the selector 250 may output the comparison signal COMP, which is the high signal (S313). That is, the selector 250 may output the comparison signal COMP having 1.

The determiner 231 may generate temperature code data TCODE, on the basis of the comparison signal COMP that is output from the selector 250 when the first delay clock signal P1BD is input (S312). Here, the temperature code data TCODE[n] may be 0. Furthermore, the determiner 231 may generate the temperature code data TCODE, on the basis of the comparison signal COMP that is output from the selector 250 when the first delay clock signal P1BD is input (S314). Here, the temperature code data TCODE[n] may be 1. In the determiner 231, because the comparison signal COMP corresponds to 1 when the first delay clock signal P1BD is input at the first cycle PR1, the temperature code data TCODE[n] may be 1. In the present specification, since the description will be provided on the assumption that the temperature-proportional digital signal DPTAT is 5 bits, n may be 4 and the temperature code data TCODE[4] may be 1 at the first cycle PR1.

The determiner 231 may provide the temperature code data TCODE to the digital signal generator 232 and the control signal generator 233.

The first controller 230 may generate the control signal CS and the temperature-proportional digital signal DPTAT on the basis of the temperature code data TCODE (S315). The digital signal generator 232 may generate the temperature-proportional digital signal DPTAT on the basis of the temperature code data TCODE. Here, the temperature-proportional digital signal DPTAT may be generated on the basis of the previously generated temperature code data TCODE. For example, when the temperature code data TCODE[4] is 1 and the temperature code data TCODE[3] is 1, the temperature-proportional digital signal DPTAT to be output may be 11000.

The control signal generator 233 may generate the control signal CS on the basis of the temperature code data TCODE. For example, when the temperature code data TCODE[4] is 1, the control signal CS may increase the delay amount of the first clock signal P1. Further, when the temperature code data TCODE[4] is 0, the control signal CS may reduce the delay amount of the first clock signal P1. Here, the operation of generating the first delay clock signal P1BD1 on the basis of the control signal CS may be performed during the second cycle PR2. That is, the delay operation performed during the first cycle PR1 may be performed without the control signal CS, and the delay operation performed during the second cycle PR2 may be performed on the basis of the control signal CS. By adjusting the delay amount of the first clock signal P1 through the delay locked loop circuit 240, the delay amount of the first clock signal P1 may be the same as the time interval at which the first voltage VN matches (e.g., equalizes) the second voltage VP. That is, the temperature-proportional digital signal DPTAT having a value proportional to the temperature may be output through the delayed fixed loop way. This may correspond to a successive approximation type analog-to-digital conversion circuit (e.g., Successive approximation ADC). That is, the temperature sensing unit 200 may be a successive approximation register-controlled delay locked loop (SAR DLL) circuit.

The temperature sensing unit 200 may control the delay locked loop circuit 240 on the basis of the control signal CS (S316). This operation may be performed at the second cycle PR2 and may respond to feedback.

Subsequently, the operation of the temperature sensing unit 200 at the second cycle PR2 to the fifth cycle PR5 will be described referring to FIGS. 13 to 15.

Figure 13:
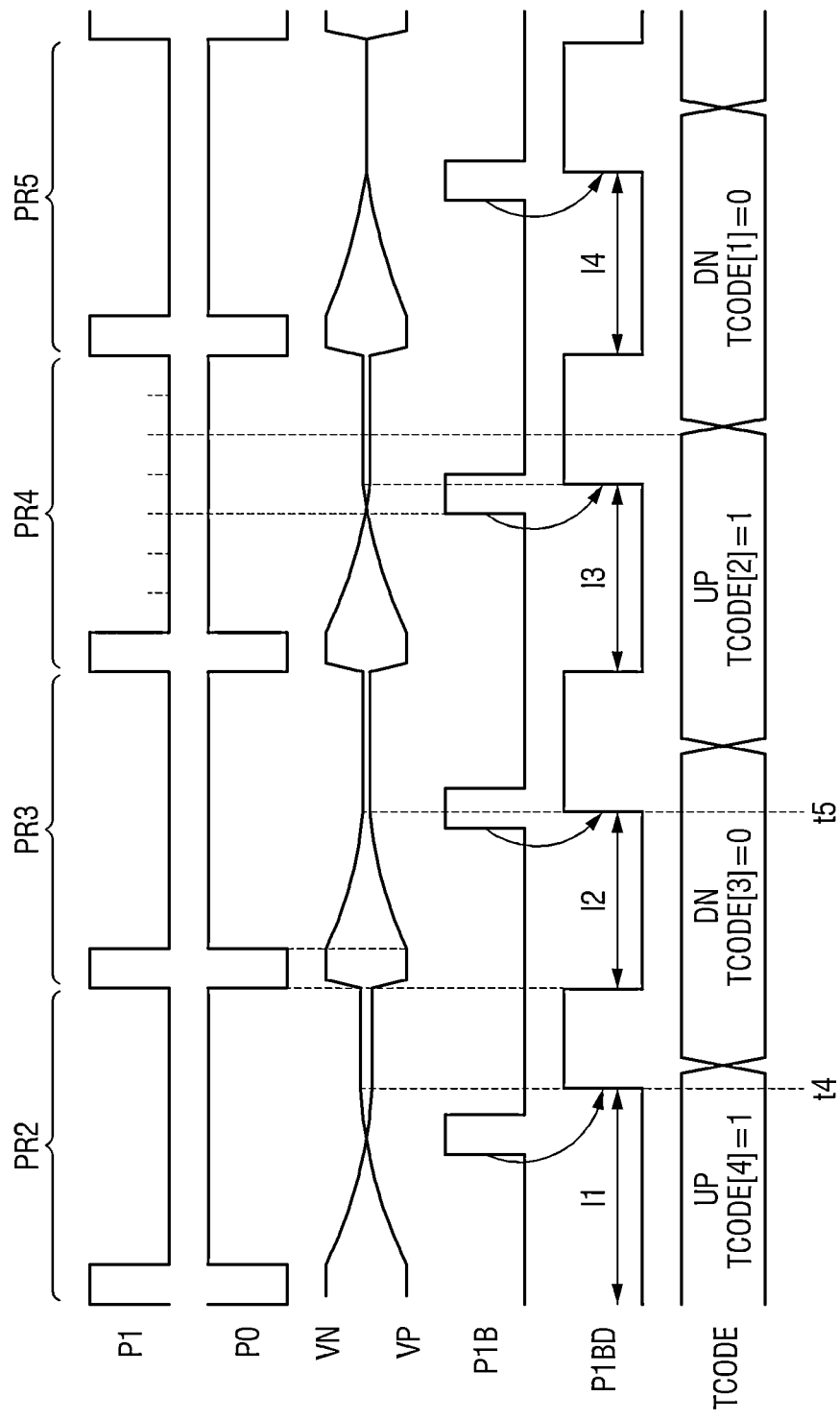
FIG. 13 is a timing diagram for explaining the operation of the temperature sensing unit according to an example embodiment.

FIG. 13 is a timing diagram for explaining the operation of the temperature sensing unit according to an example embodiment. FIGS. 14 and 15 are diagrams for explaining the operation of the temperature sensing unit according to time.

Figure 14:
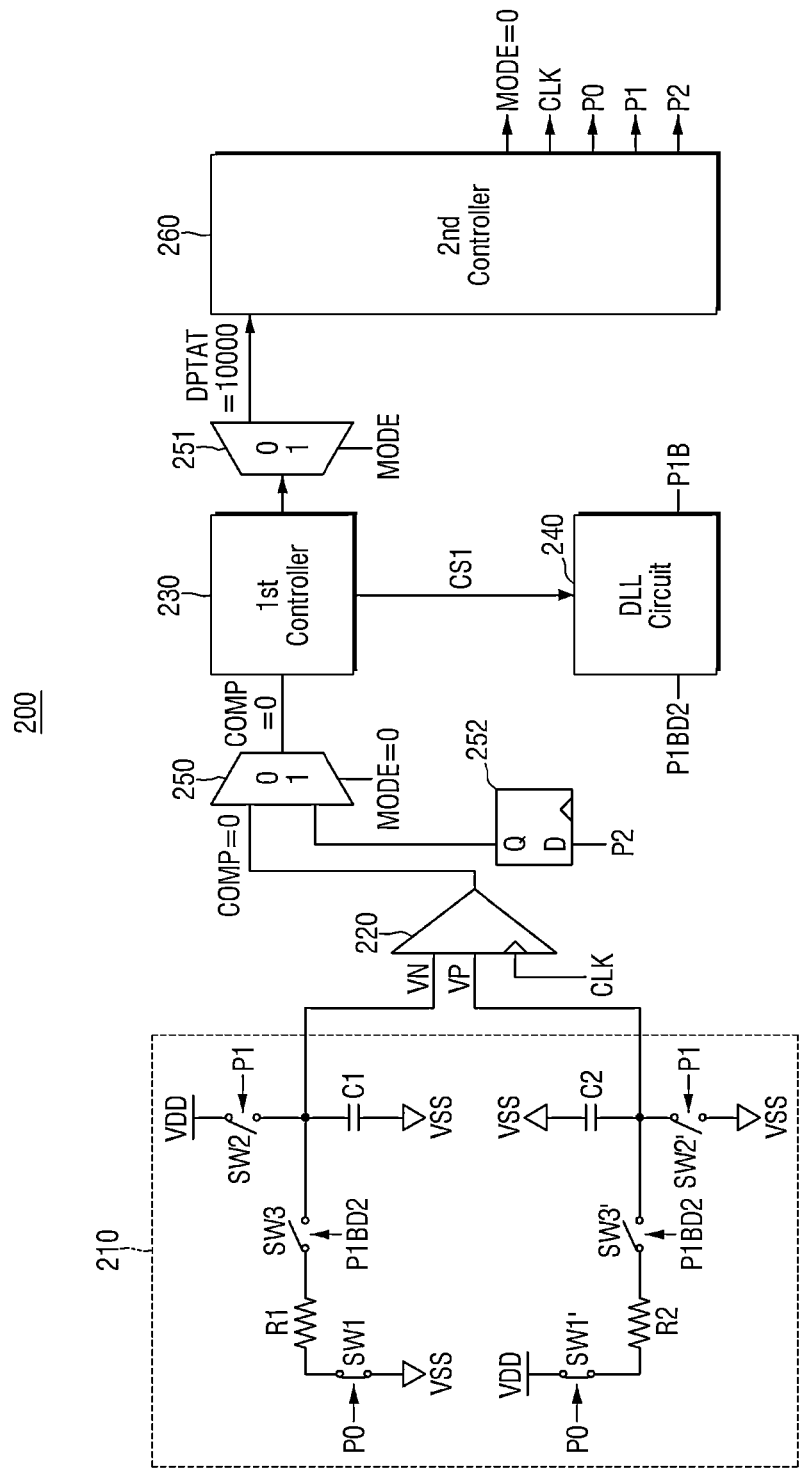
FIGS. 14 and 15 are diagrams for explaining the operation of the temperature sensing unit according to the time.

Referring to FIGS. 13 and 14, the temperature sensing unit 200 may perform the operation at the second cycle PR2. Here, the second cycle PR2 may correspond to the time interval subsequent to the first cycle PR1. That is, the first delay clock signal P1BD2 may be a signal generated on the basis of the control signal CS1 that is output through the operation of the first cycle PR1. That is, the first delay amount I1 of the first delay clock signal P1BD2 may be greater than the delay amount I0 at the first cycle PR1. Here, the first delay clock signal P1BD2 may be generated, using the first clock signal P1B. The first clock signal P1B may have a phase difference from the first clock signal P1 by half the second cycle PR2. However, example embodiments of the present disclosure are not limited thereto, and the first delay clock signal P1BD2 may be generated to have a different phase difference on the basis of the first clock signal P1.

The clock signal P0 and the first clock signal P1 may be continuously input to the temperature sensor 210. The first voltage VN may decrease as the clock signal P0 becomes a high signal, and the second voltage VP may decrease as the clock signal P0 becomes a high signal. The first voltage VN and the second voltage VP may be constant as the first delay clock signal P1BD1 is output. When the first delay clock signal P1BD1 is output, that is, at the fourth time t4, the magnitude of the first voltage VN is smaller than the magnitude of the second voltage VP, and the second controller 230 may generate temperature code data TCODE[3] corresponding to 0. The temperature-proportional digital signal DPTAT generated on the basis of the temperature code data TCODE[3] may be 10000, and the subsequently generated control signal CS2 may control the first delay clock signal P1BD2 at the third cycle PR3 so that the second delay amount I2 becomes smaller than the first delay amount I1.

Figure 15:
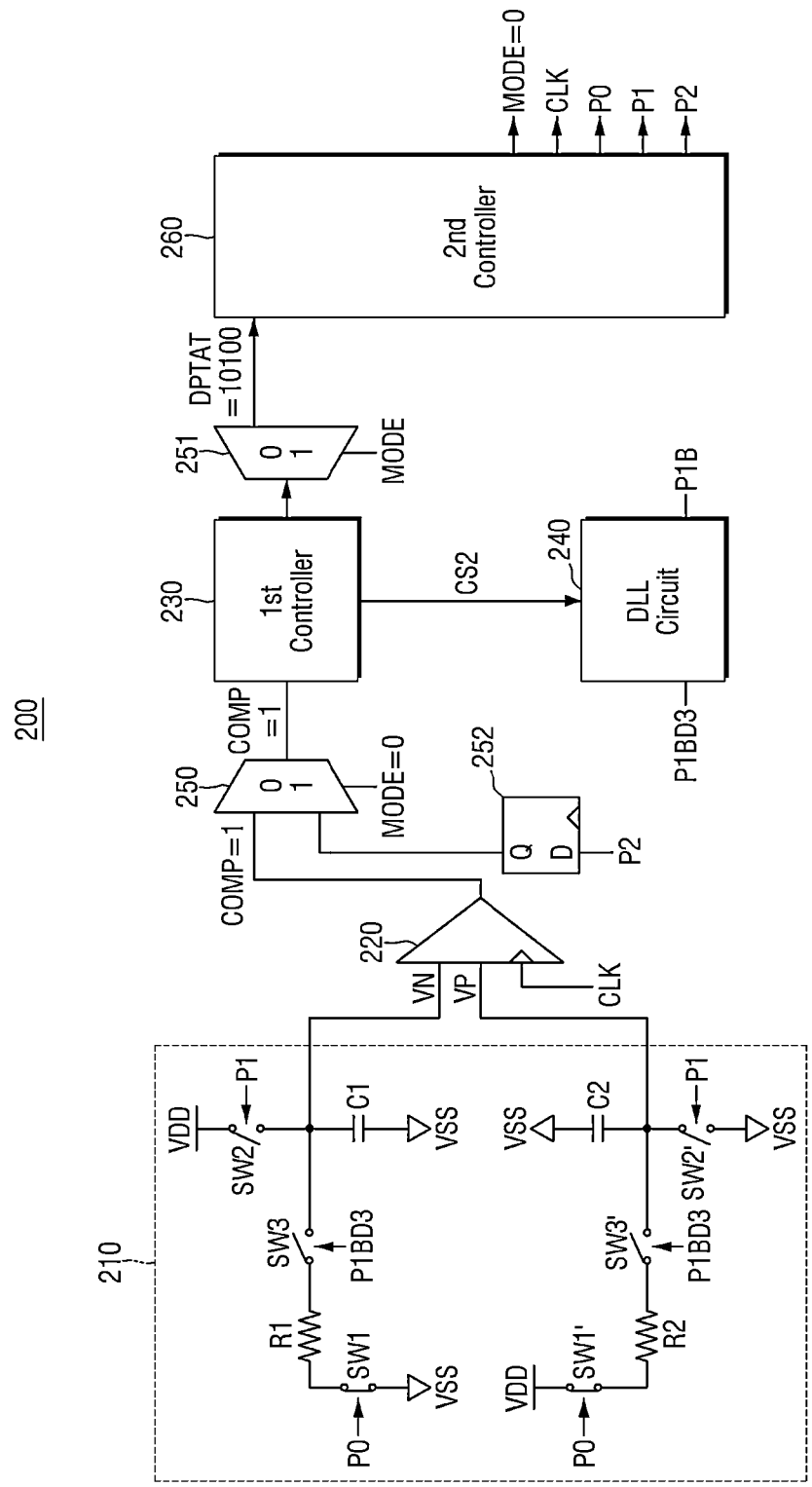

Referring to FIGS. 13 and 15, the temperature sensing unit 200 may perform the operation at the third cycle PR3. Here, the third cycle PR3 may correspond to the time interval subsequent to the second cycle PR2. That is, the first delay clock signal P1BD3 may be a signal generated on the basis of the control signal CS2 that is output through the operation of the second cycle PR2. That is, the second delay amount I2 of the first delay clock signal P1BD3 may be smaller than the first delay amount I1 at the second cycle PR2. Here, the first delay clock signal P1BD3 may be generated, using the first clock signal P1B.

The clock signal P0 and the first clock signal P1 may be continuously input to the temperature sensor 210. The first voltage VN and the second voltage VP may be constant, as the first delay clock signal P1BD2 is output. When the first delay clock signal P1BD2 is output, that is, at the fifth time t5, the magnitude of the first voltage VN is greater than the magnitude of the second voltage VP, and the first controller 230 may generate temperature code data TCODE[2] corresponding to 1. The temperature-proportional digital signal DPTAT generated on the basis of the temperature code data TCODE[2] may be 10100, and the subsequently generated control signal CS may control the first delay clock signal P1BD3 at the fourth cycle PR4 so that the third delay amount I3 becomes greater than the second delay amount I2.

By continuing the operation at the first cycle PR1 to the third cycle PR3, a rising edge of the first delay clock signal P1BD may become the same as the time point at which the first voltage VN becomes the same as the second voltage VP. That is, the comparator 220, the first controller 230 and the delay locked loop circuit 240 may fix the delay amount of the first delay clock signal P1BD. For example, the temperature-proportional digital signal DPTAT that is output after the fifth cycle PR5 may be 10101, and the first operation cycle may be finished. That is, the temperature-proportional digital signal DPTAT, which is proportional to the system on chip, may be output. Unlike a phase locked loop way which locks the phase, the temperature measurement time may be reduced by utilizing the delay locked loop circuit 240. Also, an accurate temperature measurement may be performed within less time. Further, the temperature sensing unit 200 may utilize the power supply voltage and the ground voltage used by the processor 110, and the power consumption may be reduced. The temperature sensing unit 200 including the digital circuit DC has a smaller area, and the digital circuit DC corresponds to a synthesizable circuit, and may be flexibly designed. Further, because the area occupied by the analog circuit AC is reduced, the power consumption may be reduced and the noise may be reduced.

Hereinafter, the operation S302 of the temperature sensing unit 200 according to the second operation cycle will be described referring to FIGS. 16 to 20.

Figure 16:
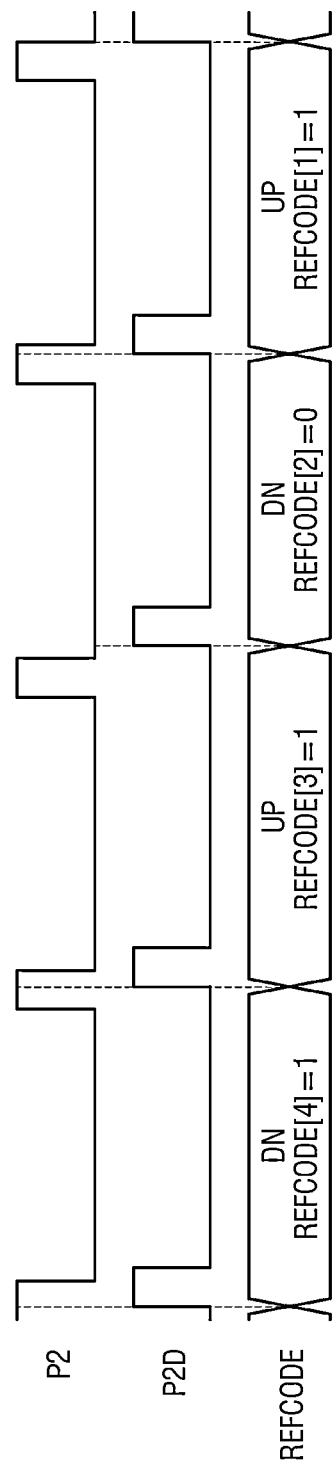
FIG. 16 a timing diagram for explaining the operation of the temperature sensing unit according to an example embodiment.
Figure 17:
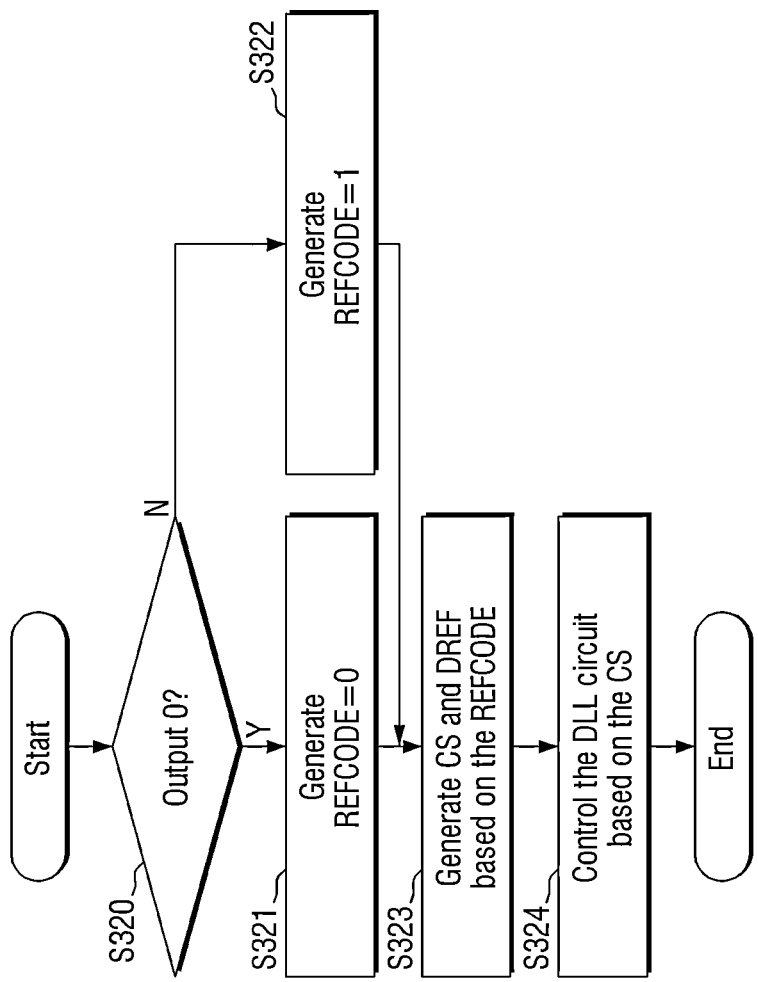
FIG. 17 is a flowchart for explaining the operation of the temperature sensing unit.
Figure 18:
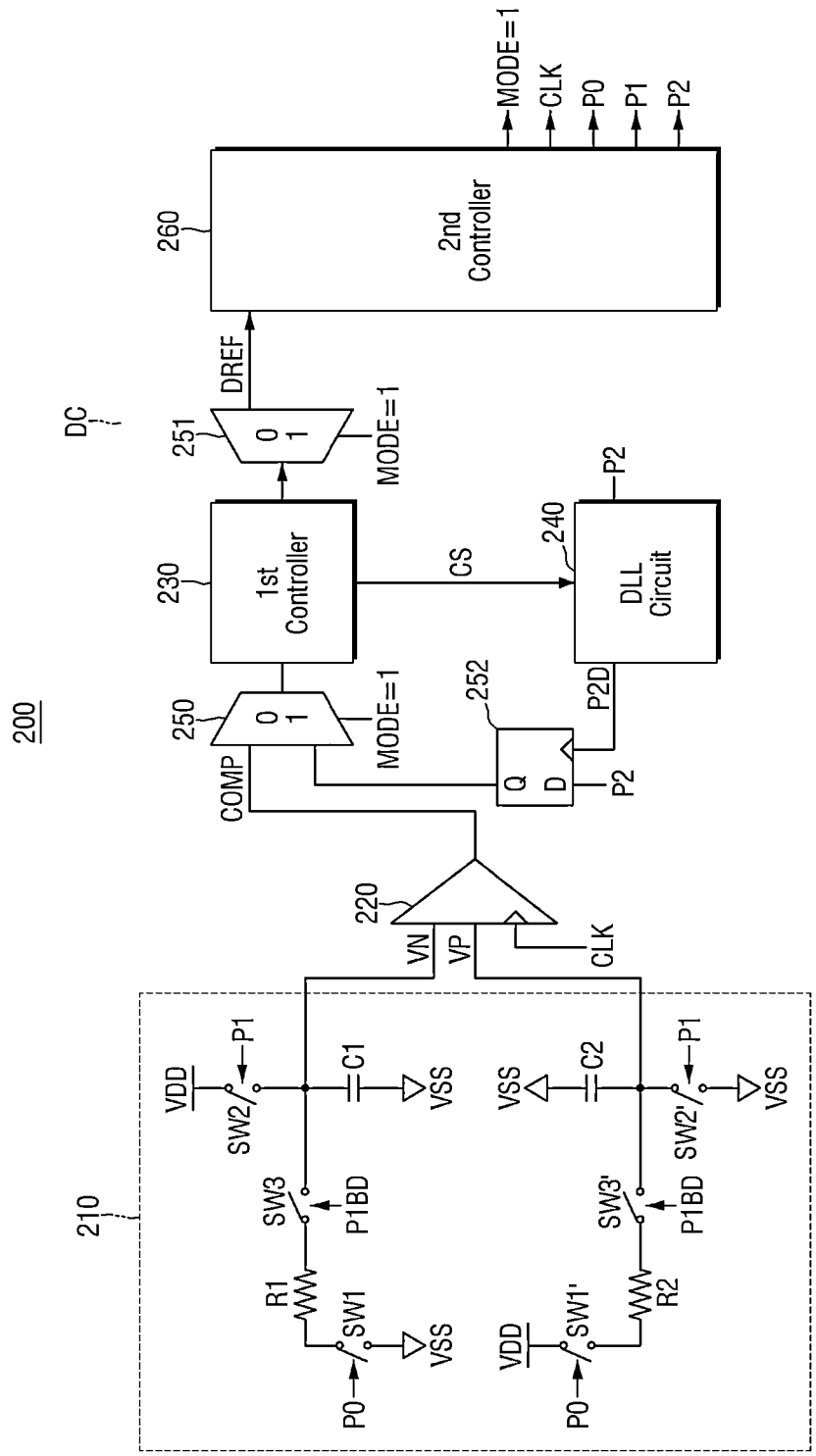
FIG. 18 is a diagram for explaining the operation of the temperature sensing unit according to FIGS. 16 and 17.

FIG. 16 is a timing diagram for explaining the operation of the temperature sensing unit according to an example embodiment. FIG. 17 is a flowchart for explaining the operation of the temperature sensing unit. FIG. 18 is a diagram for explaining the operation of the temperature sensing unit according to FIGS. 16 and 17.

Referring to FIGS. 16 to 18, the mode MODE of the selector 250 and the selector 251 may be 1. That is, the selector 250 does not output the comparison signal COMP, may output the latched second clock signal P2, and the selector 251 may output the reference digital signal DREF. That is, at the second operation cycle, the temperature sensor 210 and the comparator 220 may not operate or may not output a signal, and instead, the latch 252 may operate. Here, the latch 252 may include a flip-flop.

The second clock signal P2, and the second delay clock signal P2D obtained by delaying the second clock signal P2 may be input to the latch 252. The latch 252 may latch the second clock signal P2 in synchronization with the second delay clock signal P2D. That is, the latch 252 may output the latched second clock signal P2. For example, the latch 252 may output the second clock signal P2 which is latched only during application of the second delay clock signal P2D. That is, the second clock signal P2 latched only during the time interval may correspond to 1.

The first controller 230 may determine whether the latch 252 and the selector 250 output 0 (S320). When the latch 252 outputs 0 (S320-Y), the first controller 230 may generate the reference code data REFCODE corresponding to 0 (S321). Further, when the latch 252 does not output 0 (S320-N), that is, when the latch 252 outputs 1, the first controller 230 may generate the reference code data REFCODE corresponding to 1 (S322). For example, at the first operation cycle, the latch 252 may output 1, and the first controller 230 may generate the reference code data REFCODE[4] corresponding to 1.

The first controller 230 may generate the control signal CS and the reference digital signal DREF on the basis of the reference code data REFCODE (S323). The temperature sensing unit 200 may control the delay fixed loop circuit 240 on the basis of the control signal CS (S324). That is, the output control signal CS may increase the delay amount of the second delay clock signal P2D with respect to the second clock signal P2. In contrast, the control signal CS generated on the basis of the reference code data REFCODE corresponding to 0 may reduce the delay amount of the second delay clock signal P2D with respect to the second clock signal P2.

A falling edge of the second clock signal P2 may become the same as a rising edge of the second delay clock signal P2D through the operation at the second operation cycle. That is, the latch 252 may compare the time of the falling edge of the second clock signal P2 with the time of the rising edge of the second delay clock signal P2D. Accordingly, the first controller 230 may output the reference digital signal DREF, and the reference digital signal DREF may have a data value corresponding to the time at which the second clock signal P2 is applied.

Figure 19:
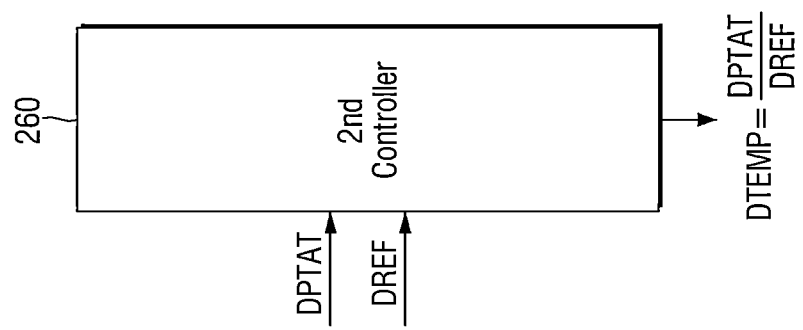
FIG. 19 is a diagram for explaining the operation of the second controller according to an example embodiment.
Figure 20:
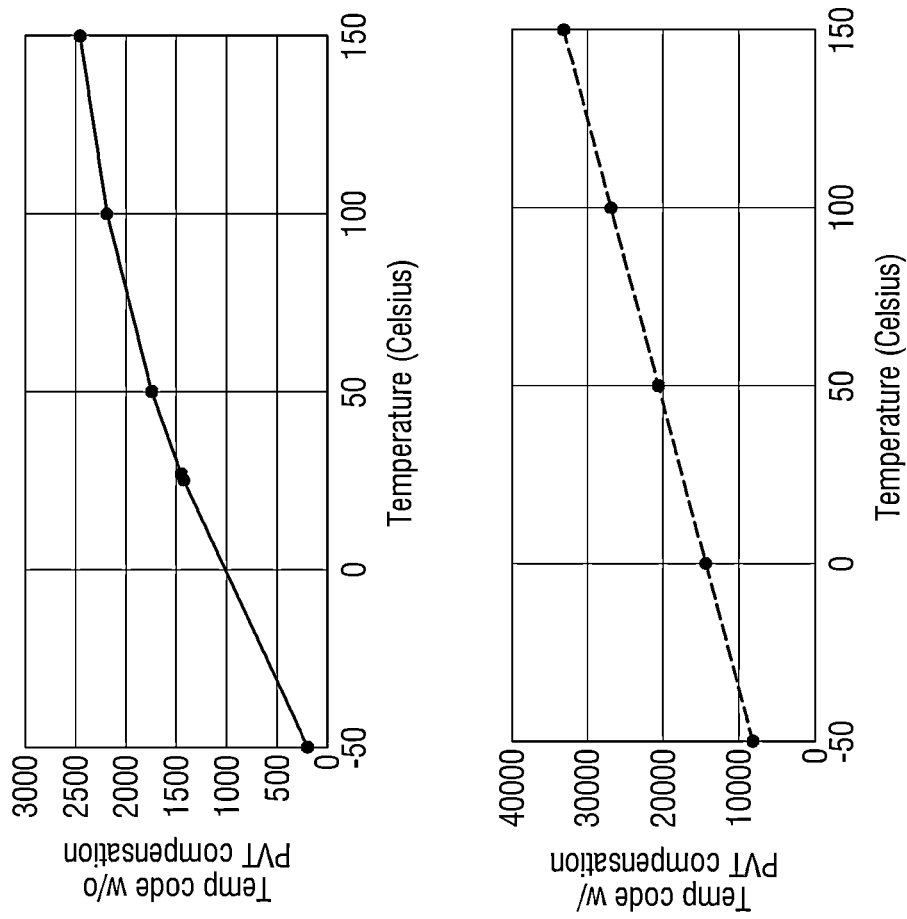
FIG. 20 is a graph for explaining the effect of the second controller of FIG. 19.

FIG. 19 is a diagram for explaining the operation of the second controller according to an example embodiment. FIG. 20 is a graph for explaining the effect of the second controller of FIG. 19.

Referring to FIG. 19, the second controller 260 may receive the temperature-proportional digital signal DPTAT and the reference digital signal DREF. The second controller 260 may generate the temperature digital signal DTEMP on the basis of the temperature-proportional digital signal DPTAT generated at the first operation cycle and the reference digital signal DREF generated at the second operation cycle. Here, the temperature digital signal DTEMP may be a ratio of the temperature-proportional digital signal DPTAT to the reference digital signal DREF.

The temperature sensing unit 200 may convert the temperature into a time domain, but the operation may be affected by changes in PVT (process/voltage/temperature). Therefore, by dividing the temperature-proportional digital signal DPTAT by the reference digital signal DREF corresponding to the delay time of the second clock signal P2, it is possible to reduce the influence of PVT changes. That is, the PVT changes may be offset.

Referring to FIG. 20, an amount of change in the temperature code data TCODE when there is no PVT compensation may vary with an increase in temperature. That is, the temperature sensing unit 200 may output the temperature code data TCODE affected by the PVT changes. However, the temperature code data TCODE when there is a PVT compensation may have a constant amount of change with an increase in temperature. That is, the PVT changes may be compensated by the compensatory operation of the second controller 260.

Hereinafter, a temperature sensing unit 200' including a time-digital converter TDC which performs the time-digital conversion operation will be described referring to FIG. 21.

Figure 21:
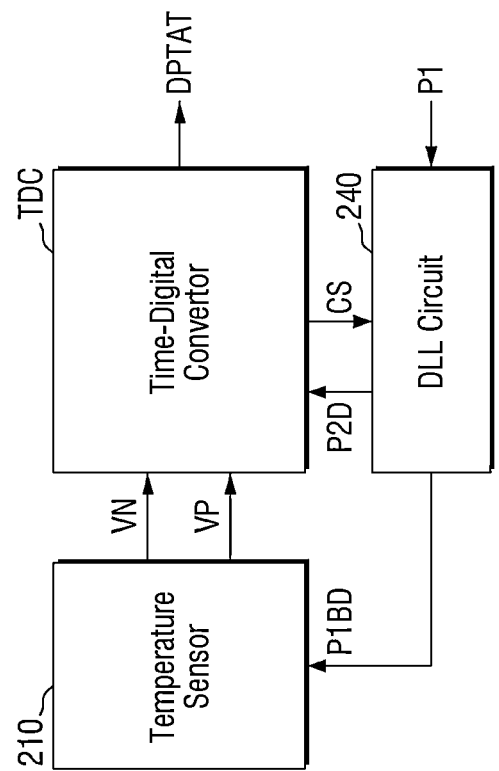
FIG. 21 is a block diagram of the temperature sensing unit according to an example embodiment.

FIG. 21 is a block diagram of the temperature sensing unit according to an example embodiment. For convenience of explanation, repeated parts of contents explained using FIGS. 1 to 20 will be briefly explained or omitted.

Referring to FIG. 21, the temperature sensing unit 200' may include a temperature sensor 210, a time-digital converter TDC, and a delay locked loop circuit 240. Here, the temperature sensor 210 and the delay locked loop circuit 240 may correspond to the temperature sensor 210 and the delay locked loop circuit 240 of the temperature sensing unit 200 described referring to FIGS. 1 to 20. The time-digital converter TDC may be connected to the temperature sensor 210 and the delay locked loop circuit 240 to send and receive data. For example, the time-digital converter TDC may include a comparator 220, a selector 250, a selector 251, a latch 252, a first controller 230, a second controller 260, and the like. However, example embodiments of the present disclosure are not limited thereto, and the time-digital converter TDC may include only a partial configuration.

The time-digital converter TDC may generate the temperature-proportional digital signal DPTAT on the basis of the first voltage VN and second voltage VP that are received from the temperature sensor 210. For example, as explained above, the time interval from the time point at which the first voltage VN and the second voltage VP start to change to the time point at which the first voltage VN and the second voltage VP are the same may be converted into the temperature-proportional digital signal DPTAT. That is, temperature data may be converted into voltage, time, and digital data.

At this time, the delay fixed loop circuit 240 may delay the first clock signal P1 using the control signal CS generated on the basis of the generated temperature-proportional digital signal DPTAT, and generate the first clock delay signal P1BD. The first clock delay signal P1BD may be provided to the temperature sensor 210 to perform accurate time-digital conversion. This operation is performed by the delay locked loop way, and thus, the consumption time may be reduced.

Hereinafter, the temperature sensing system 30 will be described referring to FIG. 22.

Figure 22:
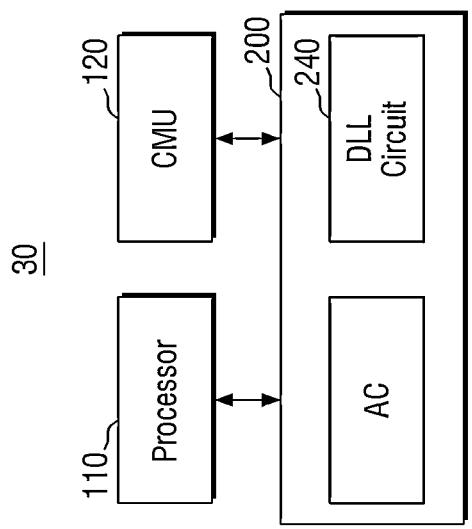
FIG. 22 is a block diagram of the temperature sensing system according to an example embodiment.

FIG. 22 is a block diagram of the temperature sensing system according to an example embodiment. For convenience of explanation, repeated parts of contents explained using FIGS. 1 to 21 will be briefly described or omitted.

Referring to FIG. 22, the temperature sensing system 30 may include a processor 110, a clock management unit 120, and a temperature sensing unit 200. Here, the temperature sensing unit 200 may include an analog circuit AC and a delay locked loop circuit 240 separated from each other inside. The temperature sensing unit 200 may be placed separately from the processor 110. That is, unlike the example embodiment described referring to FIG. 2 in which the temperature sensing unit 200 is included in the processor 110, the temperature sensing unit 200 may measure the temperature, using the analog circuit AC adjacent to the processor 110 outside the processor 110. At this time, although the temperature sensing unit 200 may be controlled by the processor 110 and the clock management unit 120, example embodiments of the present disclosure are not limited thereto.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In concluding the detailed description, those skilled in the art will appreciate that many variations and modifications may be made to the disclosed example embodiments without substantially departing from the principles of the present disclosure. Therefore, the disclosed example embodiments of the inventive concepts are used in a generic and descriptive sense only and not for purposes of limitation.

What is claimed is:

1. A temperature sensing device comprising:
a first temperature sensor including a first resistor element and a first capacitor, the first temperature sensor configured to generate a first voltage applied to at least one of the first resistor element or the first capacitor based on a first switch configured to be controlled by a first clock signal and a second switch configured to be controlled by a second clock signal, the second clock signal generated by delaying the first clock signal;
a second temperature sensor including a second resistor element and a second capacitor, the second temperature sensor configured to generate a second voltage applied to at least one of the second resistor element or the second capacitor based on the first clock signal and the second clock signal;
a controller configured to generate temperature code data based on the first voltage and the second voltage, and generate a control signal based on the temperature code data; and
a delay locked loop circuit configured to delay the first clock signal based on the control signal to generate the second clock signal.

2. The temperature sensing device of claim 1, further comprising:
a comparator configured to output,
a first signal of a low level to the controller when the second voltage is greater than the first voltage, and
a second signal of a high level to the controller when the second voltage is smaller than or equal to the first voltage.

3. The temperature sensing device of claim 2, wherein
the first temperature sensor is configured to generate the first voltage maintained at a first particular level in response to the second clock signal, and
the second temperature sensor is configured to generate the second voltage maintained at a second particular level in response to the second clock signal.

4. The temperature sensing device of claim 2, wherein the controller is configured to generate first temperature code data, as the temperature code data, based on the first signal when the second clock signal is input.

5. The temperature sensing device of claim 4, wherein the controller is configured to reduce a delay amount of the second clock signal with respect to the first clock signal based on the first temperature code data.

6. The temperature sensing device of claim 2, wherein the controller is configured to generate second temperature code data, as the temperature code data, based on the second signal when the second clock signal is input.

7. The temperature sensing device of claim 6, wherein the controller is configured to increase a delay amount of the second clock signal with respect to the first clock signal based on the second temperature code data.

8. The temperature sensing device of claim 2, wherein the first and second temperature sensors and the comparator are implemented by an analog circuit, and the controller and the delay locked loop circuit are implemented by a digital circuit.

9. The temperature sensing device of claim 1, wherein
the first temperature sensor is configured to generate the first voltage that decreases with time in response to the first clock signal, and
the second temperature sensor configured to generate the second voltage that increases with time in response to the first clock signal.

10. The temperature sensing device of claim 9, wherein a delay amount of the second clock signal generated by the control signal with respect to the first clock signal is proportional to a time interval for the first voltage to equalize the second voltage.

11. The temperature sensing device of claim 1, wherein the first resistor element and the second resistor element include a metal wire.

12. The temperature sensing device of claim 1, wherein
the controller is configured to generate a temperature digital signal based on the generated temperature code data, and
a value of the temperature digital signal is proportional to a delay amount of the second clock signal with respect to the first clock signal.

13. A temperature sensing device comprising:
a temperature sensor including a resistor element and a capacitor, the temperature sensor configured to convert temperature of the resistor element to a first voltage and a second voltage based on a switch configured to be controlled by a first clock signal;
a time-digital converter configured to convert a time interval from a first time point, at which a level of the first voltage starts to increase and a level of the second voltage starts to decrease, to a second time point, at which the level of the first voltage and the level of the second voltage are same, to a first temperature digital signal; and
a delay locked loop circuit configured to delay the first clock signal based on the first temperature digital signal to generate a second clock signal,
wherein the temperature sensor is configured to output the first voltage and the second voltage maintained at a particular level in response to the second clock signal.

14. The temperature sensing device of claim 13, wherein a delay amount of the second clock signal with respect to the first clock signal is proportional to the time interval from the first time point to the second time point.

15. The temperature sensing device of claim 13, wherein
the temperature sensor is configured to convert temperature of the resistor element into a third voltage and a fourth voltage, using the first clock signal and the second clock signal,
the time-digital converter is configured to convert a time interval from a third time point, at which a level of the third voltage starts to increase and a level of the fourth voltage starts to decrease, to a fourth time point, at which the level of the third voltage and the level of the fourth voltage are same, to a second temperature digital signal, and
the delay locked loop circuit is configured to delay the first clock signal based on the second temperature digital signal to generate a third clock signal.

16. The temperature sensing device of claim 15, wherein a delay amount of the third clock signal with respect to the first clock signal is proportional to the time interval from the third time point to the fourth time point.

17. The temperature sensing device of claim 13, wherein the resistor element includes a metal wire.

18. A temperature sensing device comprising:
a temperature sensor including a resistor element and a capacitor, the temperature sensor configured to convert temperature of the resistor element to a first voltage and a second voltage, based on a switch configured to be controlled by a first clock signal;
a comparator configured to generate a comparison signal based on the first voltage and the second voltage;
a flip-flop configured to receive a second clock signal different from the first clock signal and compare a time of a falling edge of the first clock signal and a time of a rising edge of the second clock signal;
a selector connected to both the comparator and the flip-flop and configured to output the comparison signal generated by the comparator; and
a digital circuit configured to generate code data based on a selector signal from the selector, the digital circuit configured to generate a control signal based on the code data and delay one of the first clock signal or the second clock signal based on the control signal,
wherein the temperature sensor is configured to be controlled by the delayed first clock signal.

19. The temperature sensing device of claim 18, wherein
the selector is configured to output the comparison signal during a first cycle, and
the digital circuit is configured to generate temperature code data, as the code data, based on the comparison signal, as the selector signal.

20. The temperature sensing device of claim 19, wherein
the selector is configured output the second clock signal sent from the flip-flop, during a second cycle different from the first cycle, and
the digital circuit is configured to generate reference code data based on the second clock signal.

* * * * *